May 16, 1933.   O. M. TUCKER ET AL   1,908,936
METHOD AND APPARATUS FOR FEEDING GLASS
Filed Dec. 9, 1922    12 Sheets-Sheet 9
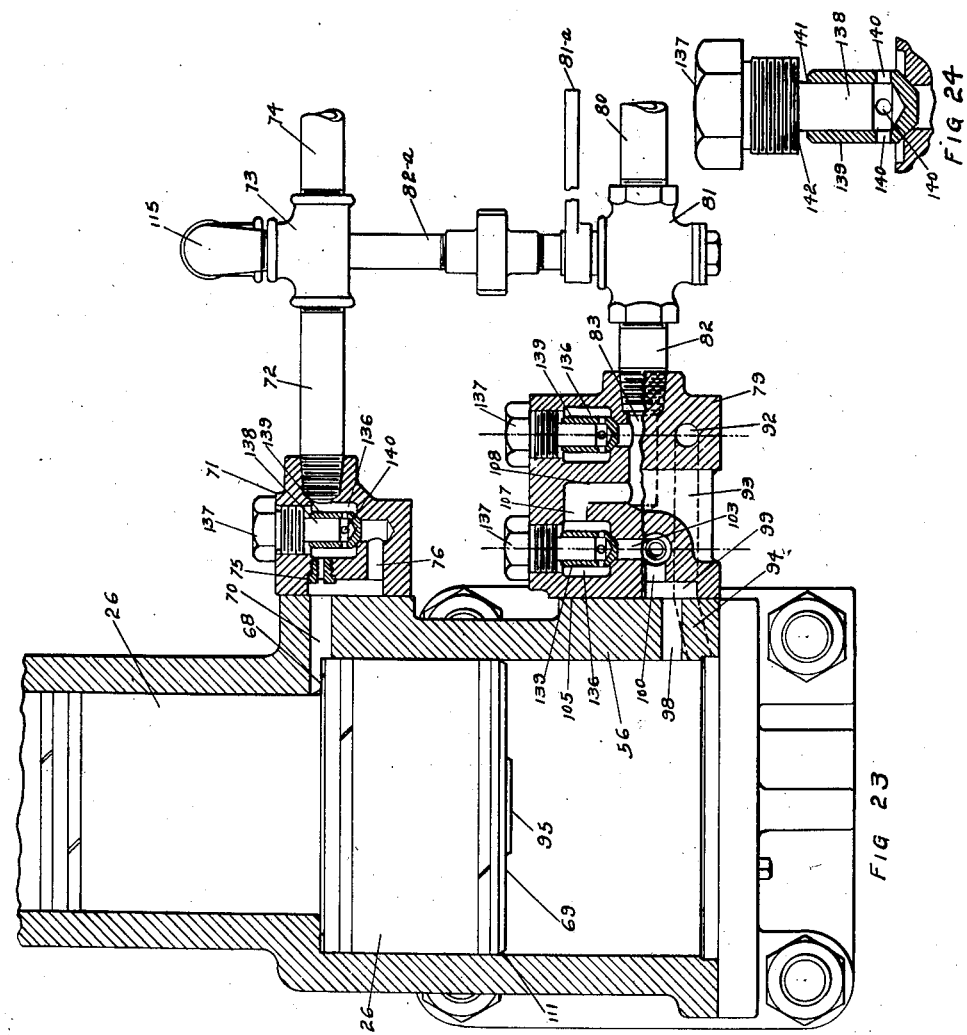
OLIVER M TUCKER
WILLIAM A REEVES   INVENTORS.
BY
Edwin P. Barber   ATTORNEY.

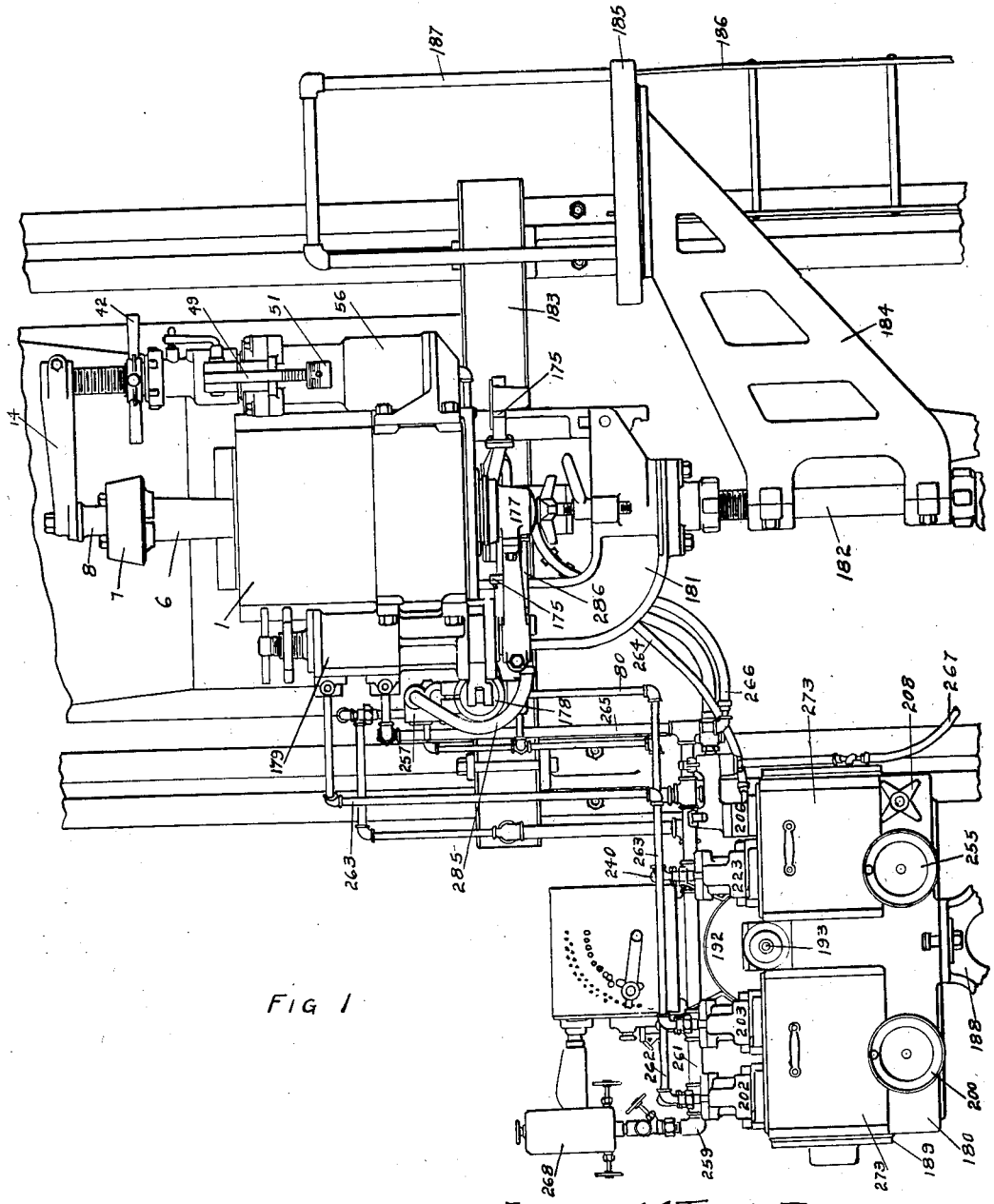

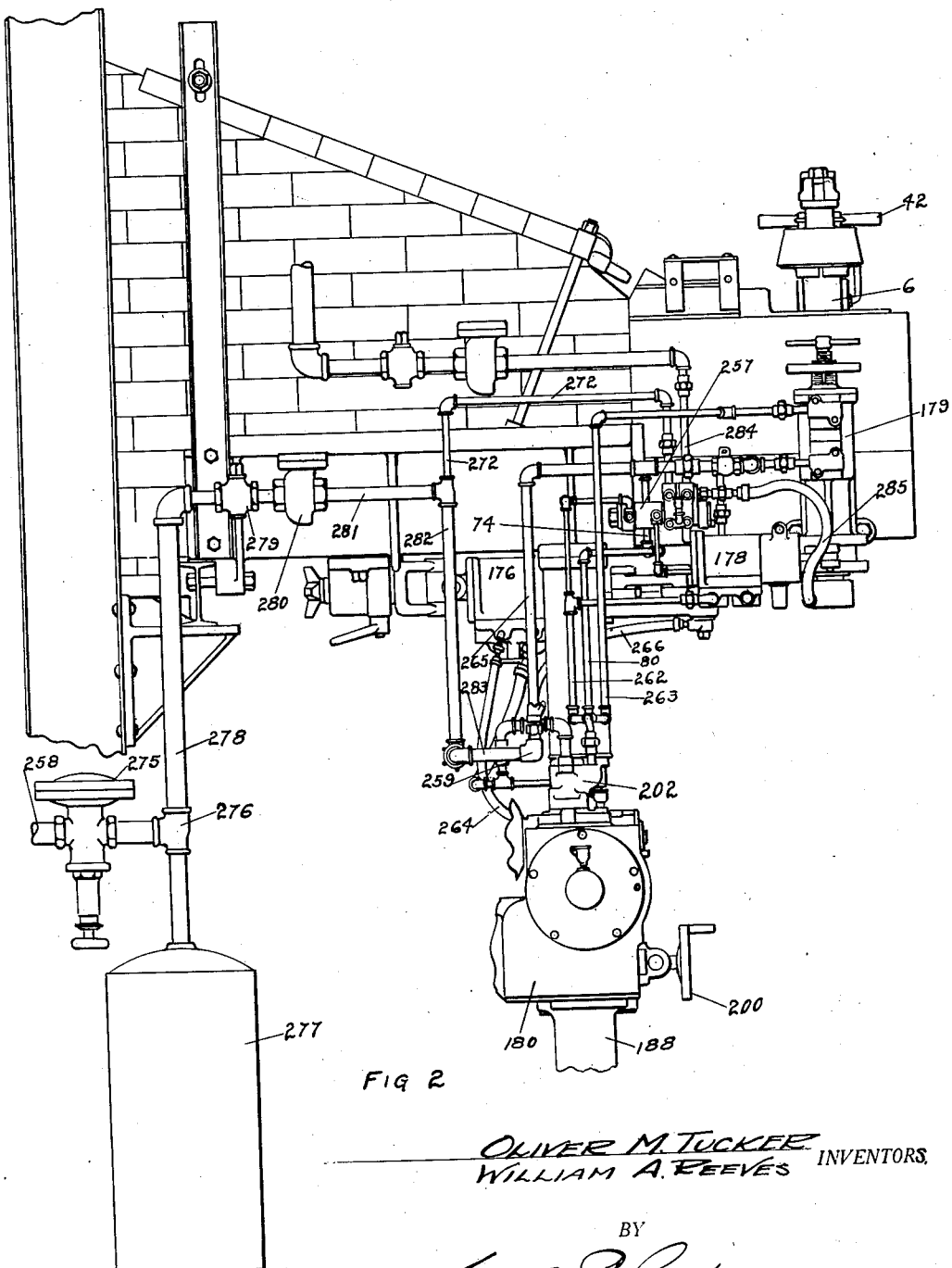

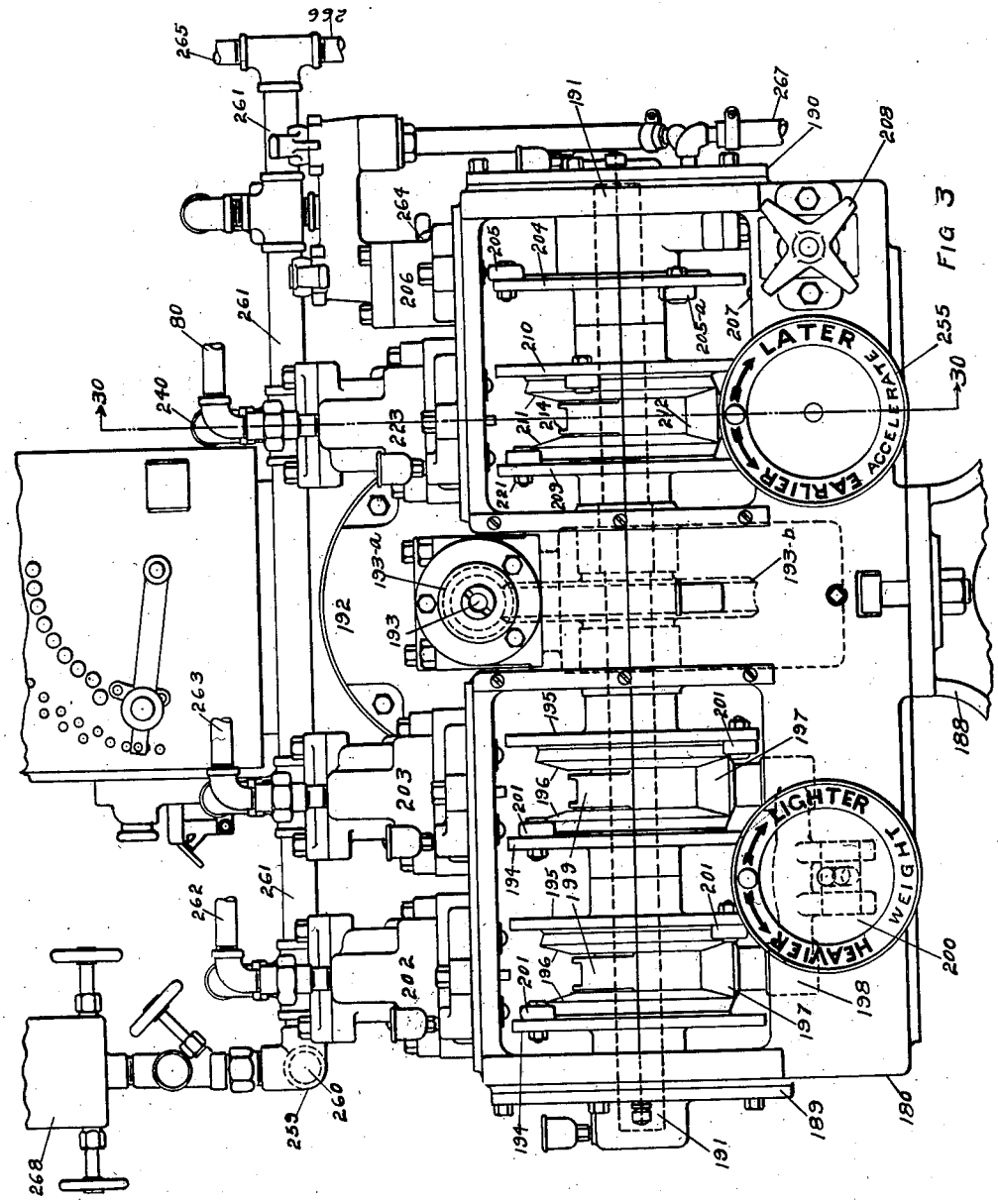

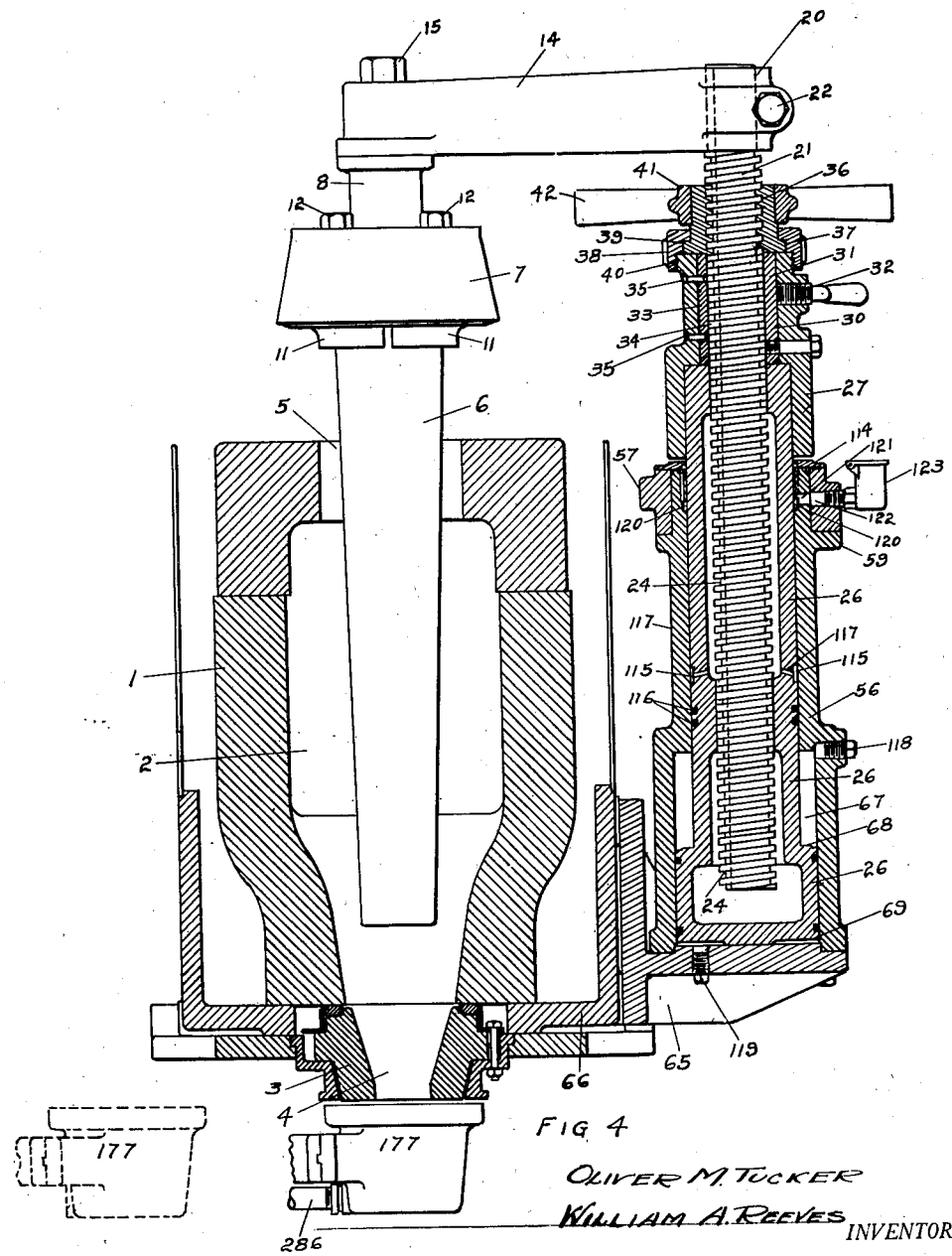

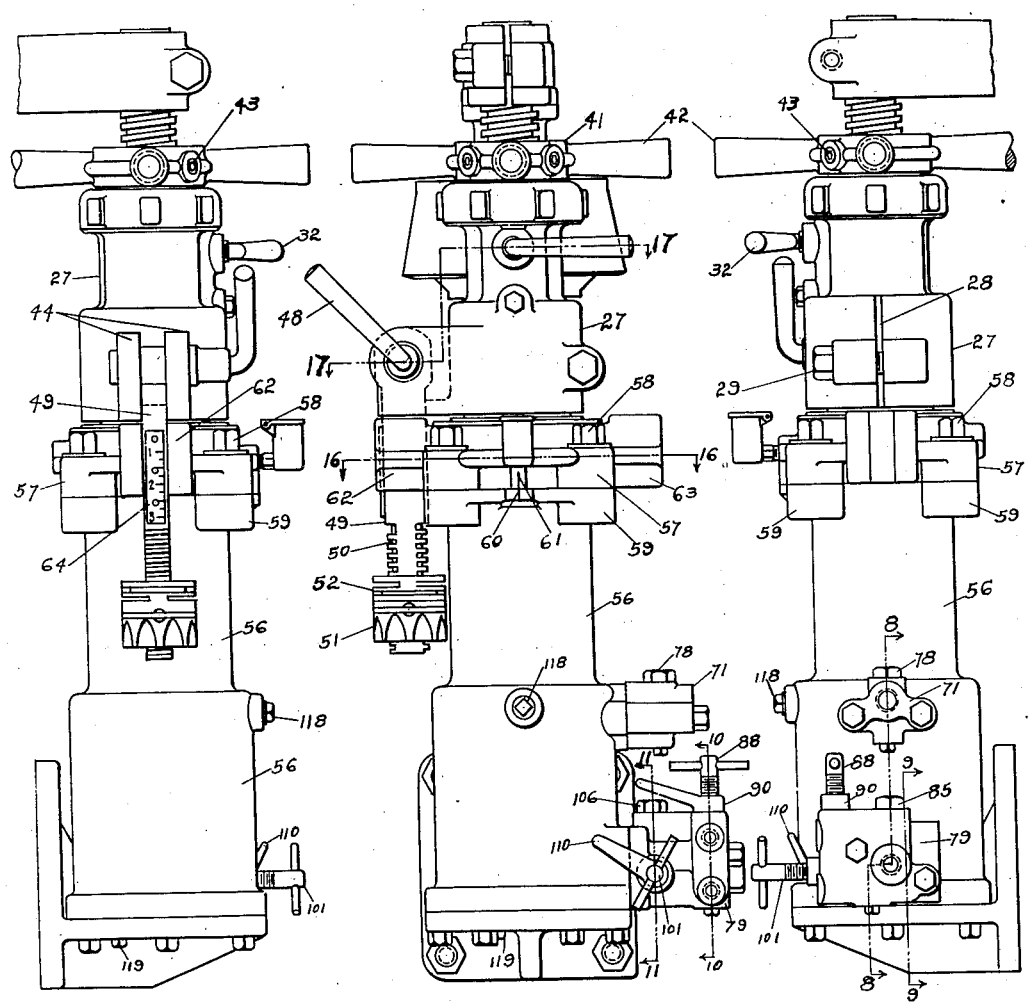

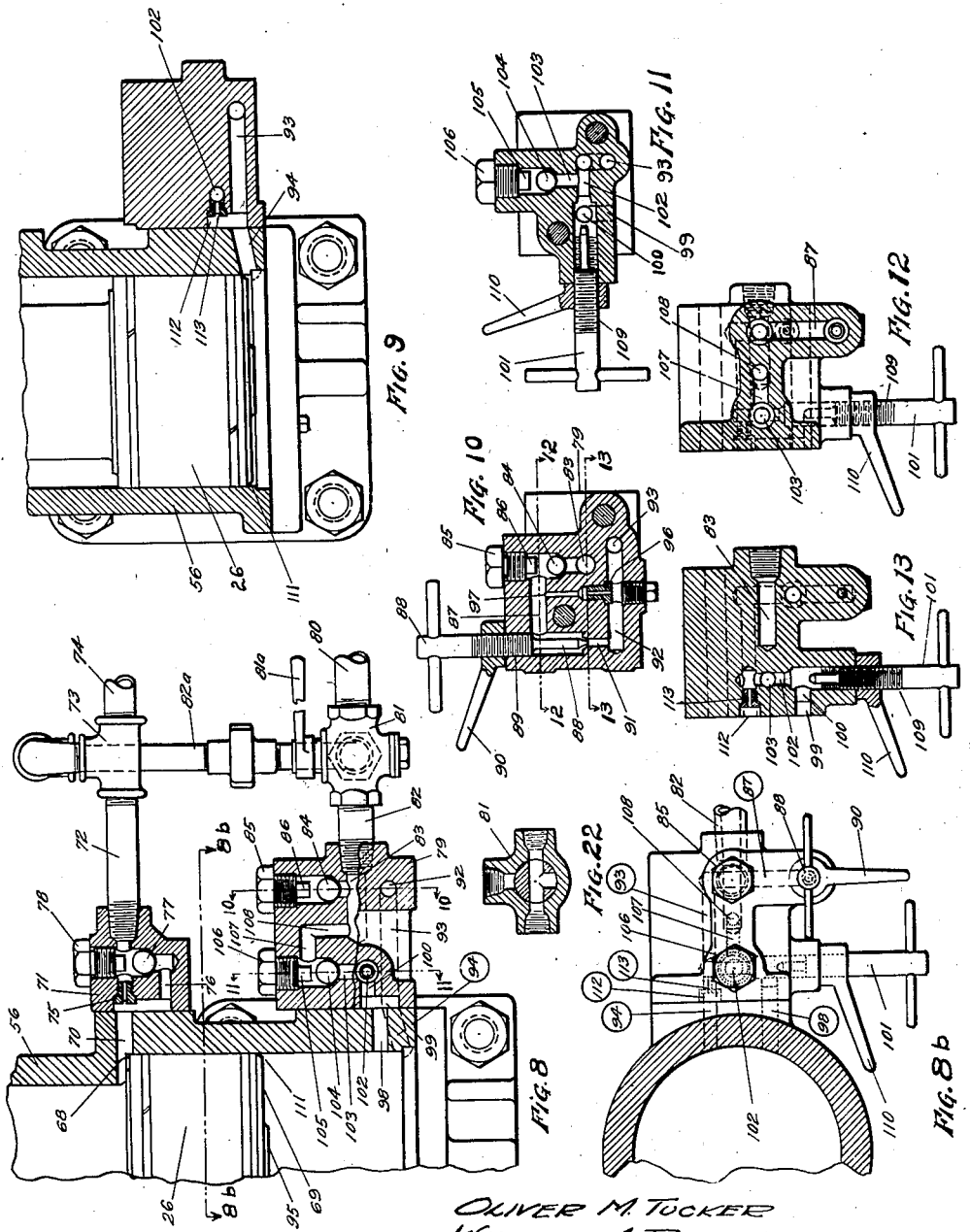

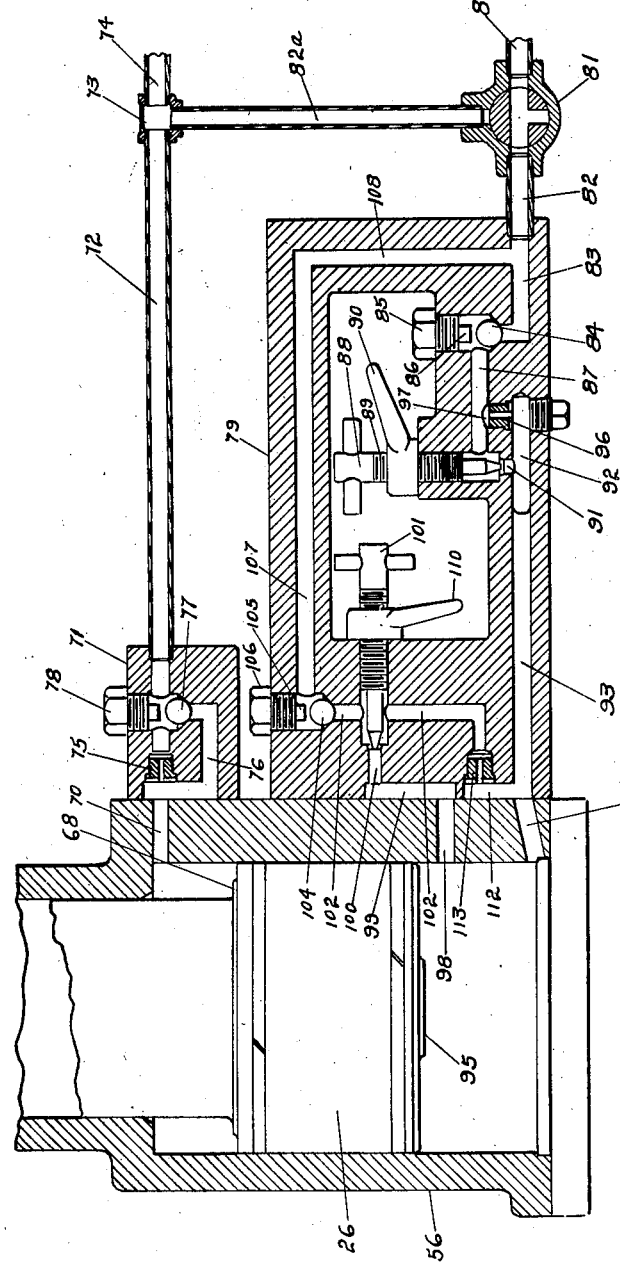

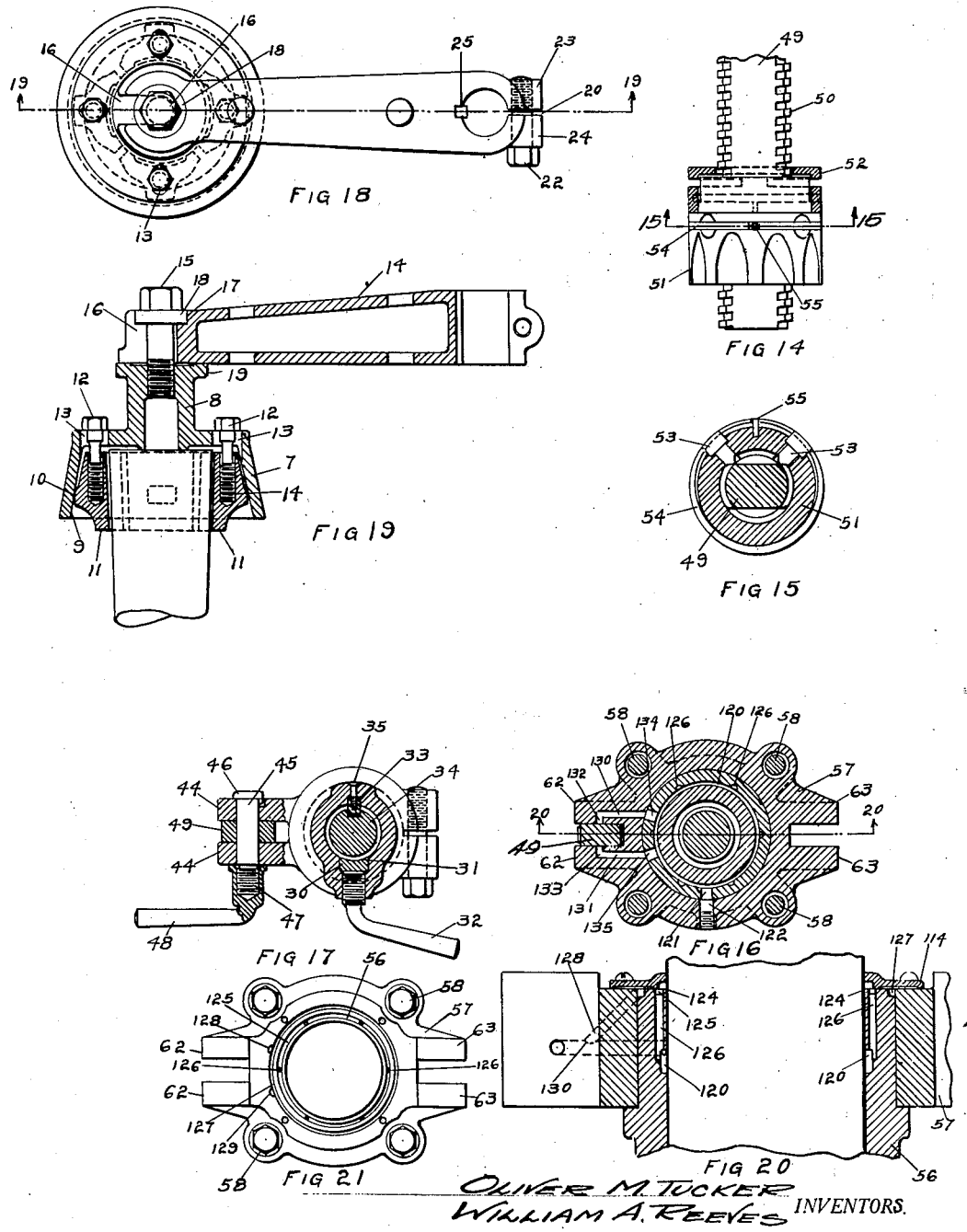

May 16, 1933. O. M. TUCKER ET AL 1,908,936
METHOD AND APPARATUS FOR FEEDING GLASS
Filed Dec. 9, 1922 12 Sheets-Sheet 10

OLIVER M. TUCKER
WILLIAM A. REEVES INVENTORS.

BY

Edwin P. Parker ATTORNEY.

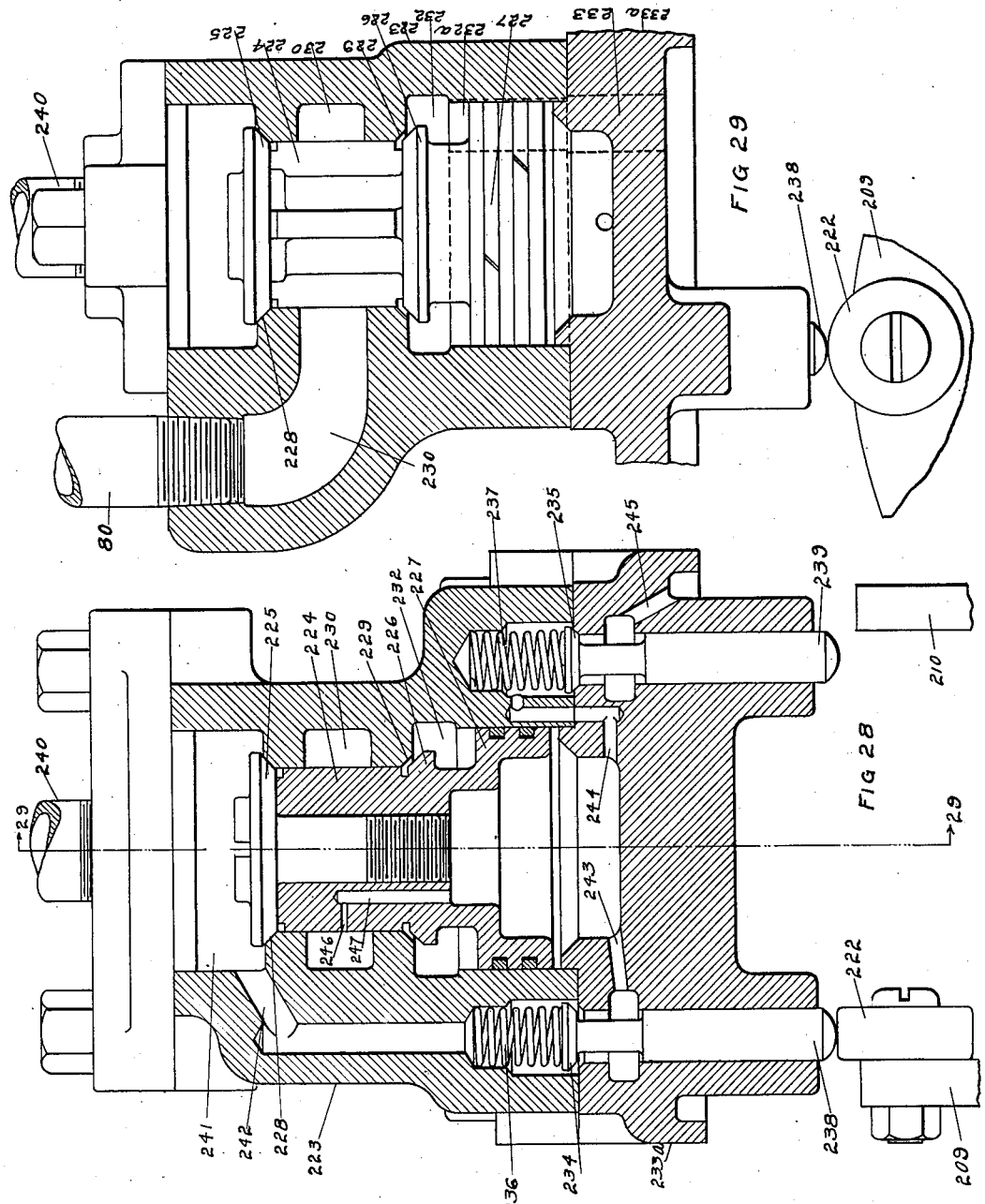

Patented May 16, 1933

1,908,936

UNITED STATES PATENT OFFICE

OLIVER M. TUCKER AND WILLIAM A. REEVES, OF COLUMBUS, OHIO, ASSIGNORS, BY MESNE ASSIGNMENTS, TO HARTFORD-EMPIRE COMPANY, OF HARTFORD, CONNECTICUT, A CORPORATION OF DELAWARE

METHOD AND APPARATUS FOR FEEDING GLASS

Application filed December 9, 1922. Serial No. 605,751.

Our invention relates to method and apparatus for feeding glass and has to do primarily with the combination of a receptacle for viscous glass having a delivery aperture in its base, intermittently effective shearing mechanism immediately therebeneath, an enclosed combustion cup for covering the delivery aperture after each cutting operation for regulable periods of time and a plunger accelerator for assisting the extrusion of the glass at the proper time.

We have provided a novel type of plunger and supporting means together with operating mechanism that is simple and yet extremely flexible. It is provided with numerous capabilities of adjustment that may be made effective independently of each other and independently of the other parts of the apparatus with which the plunger and its operating apparatus are combined. This plunger is particularly effective in combination with the enclosed combustion of gas and air burning under pressure which is utilized in cooperation with the plunger to affect the flow of the glass. One object of this invention is to provide for the ready production of charges of viscous glass which are preformed as to shape, dimensions and weight to suit the molds to which they are to be delivered. The wide variety of glassware commonly made in molds makes it highly desirable to have as complete control as possible over the shapes, weights and dimensions of the charges so that, when these charges are formed, they will enter their molds freely and will settle therein without lapping, coiling or folding. Lapping, coiling or folding of the charges are undesirable because they produce blisters, hair lines and other defects in the charges which carry over into the finished articles and which seriously detract from the value and saleability of the ware.

The preferred embodiment of our invention is shown in the accompanying drawings wherein similar characters of reference designate corresponding parts and wherein Figure 1 is a front elevation of a complete glass feeding mechanism embodying our invention.

Figure 2 is a side elevation of the glass feeding mechanism shown in Figure 1.

Figure 3 is a front elevation of the timing mechanism with doors removed showing the shaft, cam and pinion structure and their relation to their operating parts.

Figure 4 is a vertical transverse section of a spout structure with our plunger and operating mechanism and combustion cup applied thereto, the operating mechanism for the plunger being also shown in section. The combustion cup is shown in full lines in an operative (capping) relation to the delivery aperture; and is shown in dotted lines in an inoperative position.

Figure 5 is a front elevation of the operating mechanism illustrated in Figure 4.

Figure 6 is a side elevation of the structure shown in Figure 5.

Figure 7 is a rear elevation of the structures shown in Figures 5 and 6.

Figure 8 is a detail view in section of the lower end of the plunger operating cylinder and piston construction together with the pipe for conducting the fluid under pressure and the valve structure, the latter being shown in section. Further, the valve casing shown is a cross-section on an offset line 8—8 in Figure 7.

Figure 27:
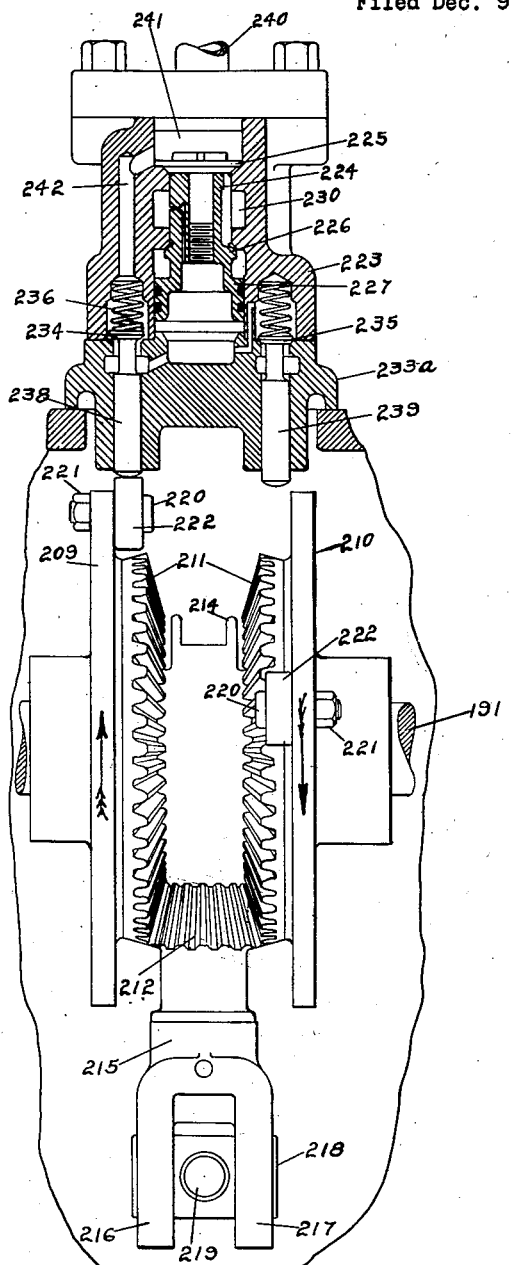

Figure 8a is a diagrammatic view of a portion of the plunger operating cylinder and piston construction together with the valves, ports and passages for controlling the admission and exhaust of fluid pressure to and from the plunger operating cylinder. It will be noted that the diagrammatic representation is provided for the purpose of facilitating understanding and shows all ports, passages and valves in the same plane whereas in actual construction, as shown in Figures 8, 9, 10, 11, 12 and 13, and they are in different planes.

Figure 8b is a top plan view of the valve structure for controlling the admission and exhaust of intermittent fluid pressure to and from the plunger operating cylinder, and being a view taken on line 8b—8b of Figure 8.

Figure 9 is a further detail view of the lower end of the plunger piston and cylinder construction for the purpose of more clearly illustrating the cushioning effect obtainable when the piston approaches lowermost position. This is also a detail sectional view taken on line 9—9 of Figure 7.

Figure 10 is a section taken on line 10—10 of Figure 8 of the valve casing structure which controls the inlet and exhaust of the fluid pressure intermittently applied for the purpose of moving the piston which carries the plunger in one direction against a constantly applied fluid pressure. This figure is also a section taken on line 10—10 of Figure 6.

Figure 11 is a section taken on line 11—11 of Figure 8, likewise through the valve casing structure. This figure is also a section taken on line 11—11 of Figure 6.

Figure 12 is a section taken on line 12—12 of Figure 10.

Figure 13 is a section taken on line 13—13 of Figure 10.

Figure 14 is a detail view partially in section of a portion of an adjustable stop structure which is regulable to vary the extent of upward movement of the piston with a resultant variation of the extent of upward movement of the plunger in the glass.

Figure 15 is a section taken on line 15—15 of Figure 14 and illustrating the novel form of pawl structure for locking the adjustable mechanism in different positions.

Figure 16 is a guide structure mounted upon the cylinder to cooperate with the adjusting nut structure for purposes to be described and is a detail view taken on line 16—16 of Figure 6.

Figure 17 is a detail view in section on line 17—17 of Figure 6 showing a locking mechanism for fixing the relative positions of the plunger and piston mechanism by clamping the adjusting screw, which is carried by the piston, in any desired relation to said piston.

Figure 18 is a top plan view of the plunger carrying arm and the segmental centering device thereon for gripping the upper end of the plunger and holding it firmly in any desired position with relation to the spout delivery aperture.

Figure 19 is a section taken on line 19—19 of Figure 18.

Figure 20 is an enlarged detail sectional view taken on line 20—20 of Figure 16.

Figure 21 is a top plan view of the swivel bar guide showing it in position on the plunger cylinder.

Figure 22 is a detail sectional view of the three way valve showing it open throughout its length as during normal operating conditions.

Figure 23 is a detail view in section of the lower end of the plunger operating cylinder and piston construction together with the pipe for conducting the fluid under pressure and showing in section our preferred form of valve mechanism for controlling the admission and exhaust of intermittent fluid pressure to and from the plunger operating cylinder.

Figure 24 is an enlarged detail sectional view of the preferred form of check valve and check valve guide.

Figure 25:
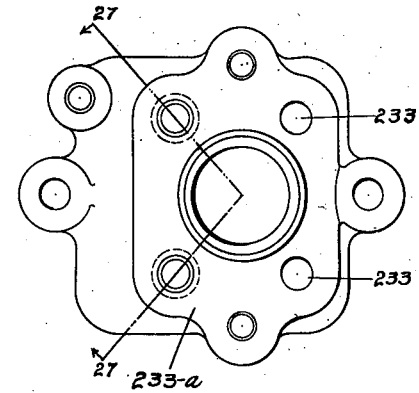

Figure 25 is a top plan view of the plunger differential and timing valve base.

Figure 26:
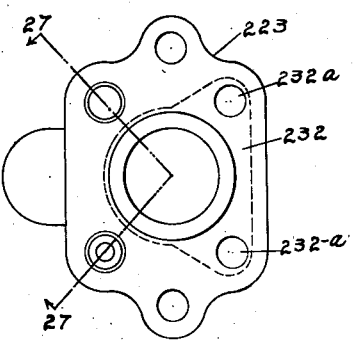

Figure 26 is a bottom plan view of the plunger differential and timing valve block.

Figure 27 is a vertical section taken approximately on line 27—27 of Figures 25 and 26 and also showing a vertical longitudinal view of a portion of the plunger timing head.

Figure 28 is an enlarged sectional view taken approximately on line 27—27 of Figures 25 and 26.

Figure 29 is a section taken on line 29—29 of Figure 28.

Figure 30:
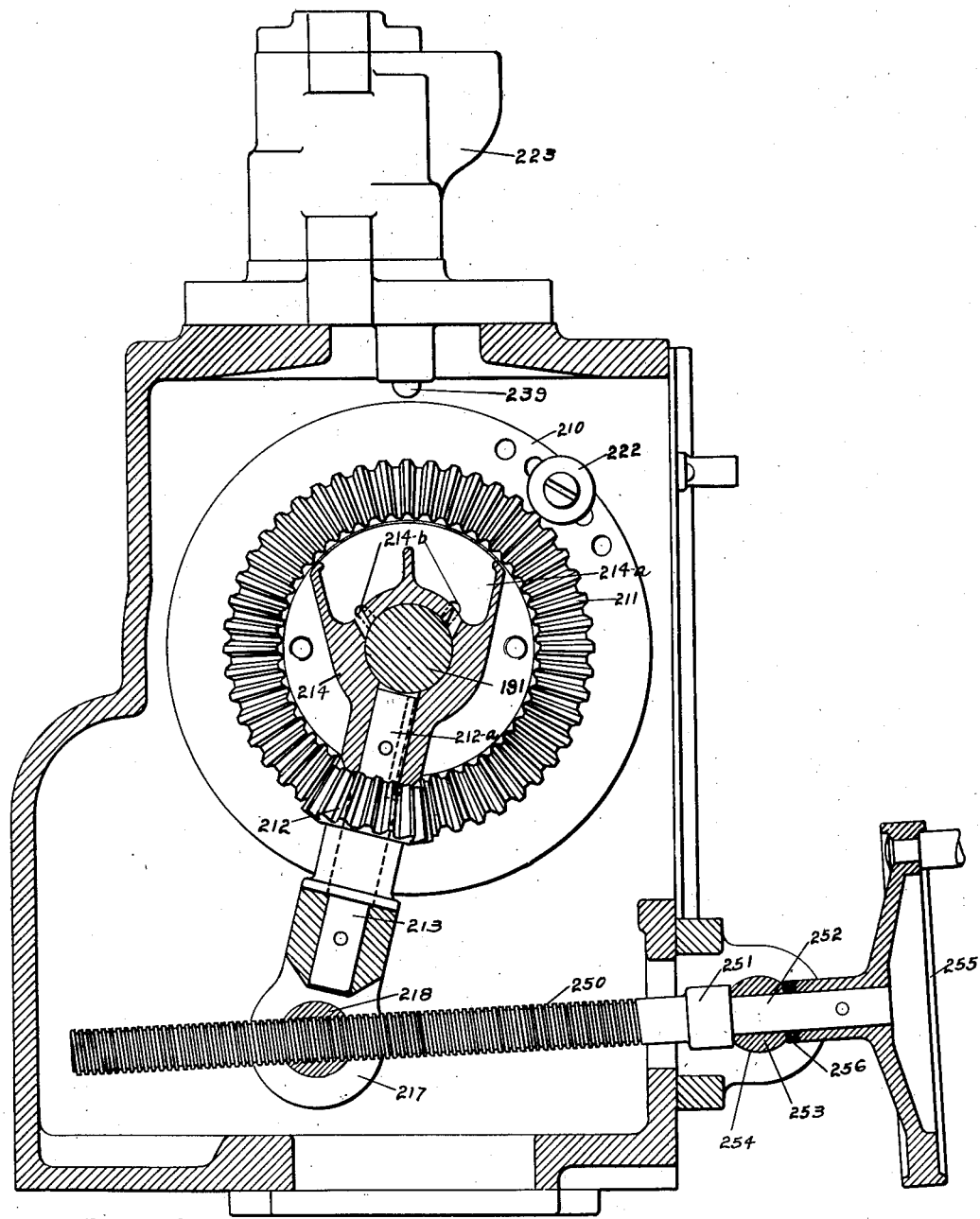

Figure 30 is a view partly in section taken on line 30—30 of Figure 3.

In Figure 1 of the drawings, we show a glass feeding mechanism embodying our invention. This glass feeding mechanism is comprised of cooperative units which operate in connection with a glass container having an opening in its base and each of which operates in a definite time relation to the others in performing its individual function or functions. Certain of these units are the shear structure and its operating mechanism, the combustion cup and its operating mechanism, the plunger with its cooperative parts and operating mechanism and the timing mechanism for controlling the times and sequence of operation of the various elements controlling the respective units.

Referring to the drawings (see Figure 4,) 1 designates a spout structure within which operates a plunger 6, the operation of this plunger 6 being controlled directly by a piston and cylinder construction which will be hereinafter specifically described. The spout structure 1 has a delivery channel 2 and an apertured bushing 3 and a delivery aperture 4 therein in proper communication with the said delivery channel 2. It will be understood that a means is provided for holding this apertured bushing against the bottom of the spout and with its aperture in concentric relation with the delivery channel 2 of the said spout structure. This means is constructed to facilitate application or removal of the bushing. Immediately above and in line with the delivery channel 2 there is provided an aperture 5 in the upper wall of the spout structure through which operates the plunger 6 for accelerating the extrusion of the glass through the delivery aperture.

Located and operating immediately below the aperture in the spout structure 1, are arms 175 (see Figure 1) carrying blades which are designed to be successively brought together and separated at regular intervals to sever the viscous glass extruding from the aperture 4. The operation of the arms 175 is controlled by a piston and cylinder mechanism which are indicated at 176 (Figure 2.) The structure and operation of these arms and their co-related mechanisms are substantially shown and described in an application which we have heretofore filed jointly on the 28th day of June, 1920, Serial No. 392,231, Patent No. 1,864,277 of June 21, 1932.

Mounted beneath the spout aperture 1 and in a certain definite operating relation to the knives 175, is a cup 177 to which a combustible mixture is introduced and burns under pressure and which is automatically effective for a predetermined time after each severing operation of the knives 175 to cap the aperture 4 and support the glass extruding therefrom by the burning gases therein. It is designed to take both horizontal and vertical movements in a certain timed relation to the operation of the said knives 175, the horizontal movements being controlled by the piston and cylinder construction designated 178 and the vertical movement by a piston and cylinder construction designated 179. This cup is operable in a timed relation to its cooperative parts to regulate the starting of the extrusion of the glass and the length of time of such extrusion. It has other functions to be subsequently referred to.

The combustion cup 177 is connected to a source of fluid pressure, preferably a combustible mixture, in such a manner that, if desired, a certain amount of the mixture is always being fed thereto. The cup 177, when the mixture is continuously fed thereto, always contains a flame which during inactive periods burns merely as a pilot light. The mixture controlling apparatus is such that when the cup 177 is moved into operative (capping) position, a great increase in the combustible mixture fed thereto takes place. Also, the mixture fed during the capping or operative period is fed under a maintained pressure. This is a highly essential requirement and is accomplished by the use of the injector 257 (Figure 2.) The structure of the combustion cup 177, its immediate operating mechanism and the injector 257 are substantially illustrated and described in an application which we have filed jointly on the 16th day of September, 1916, Serial No. 120,429, Patent No. 1,864,275 of June 21, 1932.

With this structure, molten glass charges of a definite desired shape, dimensions and weight are formed. Timing mechanism for controlling the operation of the parts abovementioned is contained in the timing box 180. The timing mechanism effects its purpose by a series of cam and valve structures which will be more fully described hereinafter.

The projecting portion of the spout structure 1 is supported by a supporting arm 181 which is, in turn, adapted to be rigidly and adjustably mounted upon the vertical standard 182. The inward portion of the said spout structure 1 is supported upon a rigid sill structure 183. Rotatably mounted upon the standard 182, is an arm 184 carrying a horizontal platform 185 upon which the person attending the feeding mechanism may stand for adjusting, regulating and replacing parts. A ladder for facilitating mounting the platform is shown at 186, while a railing on such platform is designated 187.

For accelerating the extrusion of the glass from the delivery aperture for the purpose indicated above, we provide the plunger 6. This plunger preferably takes the form of a clay member with straight sides and circular cross-sections throughout. It is preferably tapered throughout and at its uppermost and largest end is gripped by a holding device which is shown best in Figures 4, 18 and 19. This holding device preferably comprises a hood or bell member 7 which has an integral sleeve-like structure extending upwardly therefrom as at 8. The interior of the bell member 7 is provided with a tapered annular wall 9, and this wall 9 is designed to cooperate with exterior lugs 10 of segmental members 11. The surfaces of these exterior lugs 10 which contact with the inner wall of the bell member are rounded. The segmental members are independently adjustable by means of screw-bolts 12 which extend downwardly through slots 13 and are threaded into segmental members 11. The segmental members are separated under most conditions of operation and they may be so longitudinally adjusted either together or independently as to firmly hold the upper end of a plug with a minimum strain upon the plug. Furthermore, the plug will be held firmly against dropping out and will be, in a measure, laterally movable as well as slightly tiltable to produce any desired relation to the delivery aperture or to compensate for any irregularity in the form of the plunger.

The bell member is connected to the plunger supporting arm 14 by means of a bolt 15 which is threaded into the sleeve 8 and which is laterally movable into and out of a bifurcate end 16 of the arm 14. The upper surface of this arm at its end is recessed as at 17 and this recess cooperates with a flange 18 which is preferably integrally formed upon the bolt structure 15 and which, when seated in the recess 17, precludes lateral movement of the bolt and plunger. Thus, in order to remove the plunger from its carrying arm, it is only necessary to screw the bolt 15 upwardly until its flange 18 can clear the recess 17 whereupon the bolt may be moved laterally out of the bifurcate end of the arm and the plunger is thus detached from the arm. Removal of the plunger from its supporting arm and carrying of the same while it is in a highly heated condition is further facilitated by the provision of the flange 19 upon the upper end of the sleeve 8 which admits of the supporting of the plunger and socket by the flange 19 by means of a forked tool. It will be understood that this structure is such and the recess 17 is so located that the seating of the flange of the bolt 15 therein will center the plunger structure so that any further desired adjustment can be readily effected by means of the segmental members 11. On the other hand, before the plunger is mounted upon its supporting arm, its smaller end is always centered accurately with relation to the supporting bolt 15 by the proper adjustment of the segmental members 11.

The arm 14 which carries the plunger at one end is connected at its opposite end by means of a split formation 20 designed to be drawn into clamping relation to the upper end of a screw rod 21 by means of bolt 22 passing through lugs 23 and 24 as shown in Figure 18. The arm 14 is held in alignment and prevented from rotating about the screw member by means of a key 25 in a manner that will be well understood.

The screw rod 21 (see Figure 4) extends downwardly from the arm 14 through certain intermediate members and into a hollow differential area piston 26. It is actually carried upon and is made adjustable with relation to the piston by means of the intermediate structure which comprises a piston end or cross-head 27 which is split as shown at 28 (see Figure 7) and drawn together by means of the bolt 29 to grip the upper end of the piston firmly. This piston end or cross-head is slotted as at 30 (see Figures 4 and 17) and in this slot is mounted a shoe 31 designed to be forced against the screw by means of a lever handle locking screw 32 to prevent vertical movement of the screw with relation to the piston end or cross-head and, consequently, with relation to the piston. There is likewise provided (see Figures 4 and 17) a spline 33 fitting in a keyway 34 which extends the length of the screw 21, this spline being held in position in the keyway by means of two screws 35. This spline 33 serves effectually to prevent rotation of the screw 21 with relation to the piston end or cross-head and also prevents wobbling of the plunger and maintains it concentric with the delivery aperture at all elevations.

Mounted upon the top of the piston end or cross-head 27 is a bronze nut 36 (see Figure 4) which is internally threaded to co-operate with the threads of the screw member 21. This bronze nut is flanged as at 37 and is held firmly upon the upper end of the piston end or cross-head 27 by means of a ring 38 having a shoulder 39 for cooperation with the flange 37. The ring 38 is internally threaded adjacent its lower end as at 40 for co-operation with threads upon the upper end of the piston end or cross-head 27. The bronze nut 36 is embraced by a ring 41 having handle members 42 thereon and being secured to the nut by means of setscrews 43 (see Figures 5 and 7). In order to adjust the screw member 21 vertically with relation to the piston, it is only necessary to loosen the hand-screw 32 with a consequent relief of the screw 21 from pressure by the shoe 31 and then to rotate the ring member 41 by means of its handles 42. When this is done, the screw member 21 is fed vertically up or down depending upon the direction of rotation of the ring 41, the screw rod 21 being restrained from rotation by the spline 33.

The piston end or cross-head 27 is further provided with a radially extending bifurcated member 44 (illustrated best in Figures 5, 6 and 17) and which is further equipped with a cross-pin 45 (see Figure 17) having a head 46, threads 47 and a lever handle locking screw 48. The cross-pin 45 serves as a pivot for a bar 49 that normally hangs downwardly and that is provided along its lower portion with threads 50 for the reception of a knurled nut 51 upon the upper surface of which is carried a resilient washer construction 52 (see Figure 14). The bar 49 is rectangular and threaded on two sides so as to form an interrupted screw thread construction, this being illustrated best in Figure 15. The knurled nut 51 is provided with a plurality of pawls 53 extending radially therethrough and held resiliently in the path of the screw bar 49 by means of a spring ring 54. This spring ring is seated in an annular groove in the nut and extends through slots in the heads of the pawls so as to force the said pawls inward and prevent their rotation. It is itself held from rotation by means of a pin 55 extending outwardly from the nut and between the ends of the ring. The function of these pawls is to resiliently hold the nut from turning after every quarter revolution and to thereby prevent movement of the nut longitudinally of the bar 49.

Mounted upon the cylinder 56 and immediately adjacent the upper end thereof, we have provided a swivel bar guide 57 which embraces the cylinder and is secured thereto by a plurality of bolts 58 (see Figures 5, 6, 7 and 16.) As shown in Figure 16, these bolts pass through enlarged holes in the collar 57 and into the lugs 59 on the cylinder. Both the cylinder and the swivel bar guide are provided with vertical indicating lines that may be designated 60 and 61 which are normally intended to align and, under normal conditions when these lines do align, the plunger will be maintained in concentric relation with the delivery orifice of the spout. However, the enlargement of the bolt holes permits a slight rotation of the collar with relation to the cylinder, this movement being multiplied due to the length of the plunger supporting arm 14 to such an extent that the plunger may be adjusted materially in an arc to compensate for irregularities and variations due to temperature changes or to any other conditions.

The swivel bar guide 57 is provided at its front and rear with bifurcated extensions 62 and 63. The bifurcated extension 62 is intended to receive and cooperate with the downwardly extending bar 49 when the plunger is in operative position in the glass or, at least, when the plunger is in substantially concentric relation to the delivery aperture of the spout. The bifurcated extension 63 is designed to receive the bar 49 when the plunger has been withdrawn from the spout and revolved about the cylinder construction 180 degrees to a diametrically opposite location.

In Figures 5, 6 and 7, the parts are shown in the position which they assume when the plunger is in operative or lowered position in the glass. Upward movement of the piston will cause the plunger to move upwardly and eventually the spring-washer construction 52 will contact with the bifurcated member 62 and prevent further upward movement of the piston and the plunger. The knurled nut 51 may be rotated to adjust it and its resilient washer to varying positions along the bar 49 so as to regulate the extent of movement upwardly of the piston and the plunger. The extent of upward movement which actually takes place after any given adjustment is clearly indicated by means of a scale 64 carried upon the bar 49, that is, by the number of calibrations on this scale which extend above the upper edge of the bifurcated extension 62 when the piston and the plunger are in uppermost position.

In order to move the plunger to an inoperative position and out of alignment with the delivery aperture in the spout 1, the piston 26 is first elevated to its uppermost position. Then, the lever handle locking screw 32 is operated to relieve the screw 21 from the pressure of the shoe 31. Thereupon, the handwheel 41 is rotated to feed the screw 21 upwardly until the plunger 6 is in a position to clear the top of the spout structure. At this time, the lever handle locking screw 48 is rotated to release the gripping action of the bifurcated member upon the bar 49 and this bar 49 is swung outwardly and upwardly to horizontal position. Then, the bar 49 is utilized as a handle to swing the piston end or cross-head 180 degrees. At this time, the bar 49 is dropped down and into the bifurcated extension 63 and the lever handle locking screw 48 may be tightened so as to lock the bar 49 in this position.

The cylinder 56 is carried upon a bracket 65 which is mounted upon the spout framework 66. This bracket 65 constitutes the cylinder head which is provided with a drain port as shown at 119 and may be secured to the body of the cylinder by bolts in the usual manner. This cylinder construction is enlarged at its lower end as at 67 for the reception of the differential area piston 26. The differential area piston 26 is so termed because it comprises an area 68 which is at all times subjected to a constant fluid pressure and a much greater area 69 which is designed to be intermittently subjected to fluid under pressure. The constant pressure fluid forces the piston and, therefore, the plunger to lowermost position, while intermittent application of fluid pressure to the area 69 intermittently raises the piston and, likewise, the plunger to predetermined elevated position.

As shown in Figure 8, constant fluid pressure is admitted to the area 68 of the differential piston by way of a port 70 through a valve casing 71. The introduction of the fluid pressure to this valve casing 71 is by means of the pipe 72 connected by the T 73 with the pipe 74. The incoming fluid passes directly from this pipe 72 into the casing 71 and thence through an orifice plug 75 which restricts the inlet of the fluid pressure to the desired extent and which is removable and replaceable by an orifice plug having any other desired size of orifice therein. When the fluid is forced out of the cylinder back into the line during elevation of the piston, it can pass not only through the orifice plug 75, but also through the port 76 and past the check valve 77 and back into the fluid pressure line. The depending extension on the valve bonnet 78 serves to limit the lift of the check valve 77.

The valve mechanism through which the intermittent fluid pressure is applied comprises a valve casing 79 (see Figures 8 and 8a to 13, inclusive) which contains the valves that control the admission and exhaust of fluid pressure to the greater area of piston 26. For the purpose of facilitating understanding of the flow of fluid pressure through the valve structures contained in the valve casings 71 and 79, the ports, passages and valves contained therein are shown diagrammatically in Figure 8a. It will be noted that the ports, passages and valves contained in said valve casings are shown in the same plane whereas in the actual construction they are in different planes as shown in Figures 8, 9, 10, 11, 12 and 13. Intermittent pressure to raise piston 26 from lowermost position enters through pipe 80, three way valve 81, pipe 82, into passageway 83 and past ball check valve 84. The valve bonnet 85 has a depending extension 86 which limits the lift of ball 84. After passing upwardly around ball 84, the fluid pressure enters passageway 87, (see Figures 8a and 10) downwardly around stem of needle valve 88 which is adjustable by means of threads 89 and which is locked in desired position by hand lever 90, into passageways 91, 92 and 93, thence through passageway 94 into cylinder 56 under the greater area of piston 26. The piston 26 is provided with a projection 95 which permits but a small portion of the piston head area to come into contact with the cylinder head, thus permitting the fluid pressure to be applied effectively against the piston head. The application of fluid pressure through passageway 94 will raise the piston 26, shown in Figure 8, and force the fluid pressure in space 67, (see Figure 4) back through passageways 70 and 76 past valve 77 and also back through orifice plug 75, to pipes 72 and 74 into the supply line.

In the valve casing 79, there is an orifice plug 96, (see Figures 8a and 10). This plug is removable so that an orifice of any chosen diameter may be used. When needle valve 88 is closed, fluid pressure will enter through passageway 97, orifice plug 96, into passageway 92 and thence into the cylinder and under the piston head through passageway 93 and passageway 94. The hole in the orifice plug 96 determines the maximum amount of fluid pressure that may enter the cylinder 26 through passageway 94 when the needle valve 88 is closed and this determines the minimum upward speed of the piston 26. Greater upward speeds of piston travel may be obtained by opening needle valve 88 to different degrees.

A timing mechanism (see Figures 3, 27, 28 and 29) intermittently supplies and exhausts the fluid pressure under piston 26 at predetermined intervals through the pipe 80, three way valve 81, and pipe 82. When the exhaust period occurs, the fluid pressure escapes under control back through the piping through which it entered. With this release of the intermittent pressure, the constant pressure as supplied through port 70, Figures 8 and 8a, will force the piston downwardly. As the piston descends, (see Figures 8, 8a, 11 and 13) it forces the fluid pressure out through passageways 98, 99 and 100, past the point of needle valve 101, through passageway 102, through passageway 103, up past ball check valve 104, whose lift is limited by depending stem 105 of valve bonnet 106. The fluid pressure after passing around ball check valve 104 enters passageways 107, 108, and 83 (see Figures 8 and 8a) and, from this point, it discharges through pipe 82, valve 81, pipe 80 and the plunger timing valve mechanism into the timer box 180 and thence to the atmosphere, (see Figures 25, 26, 28 and 29.) The needle valve 101 controlling the exhaust is adjustable by means of threads 109 and is to be locked in chosen position by hand lever 110, Figures 11 and 13.

The piston head of piston 26 is chamfered at its lowermost edge as at 111, Figures 8 and 9. As the piston head approaches the cylinder head, it cuts off port 98, and this traps the remainder of the fluid pressure in the cylinder to provide a cushioning effect and forms a cushion. The chamfer 111 prevents the abrupt stopping of the piston by closing the port 98 gradually. The fluid pressure so trapped escapes through port 94, (see Figures 8, 8a, 9 and 13) and passageway 112, orifice plug 113, into a continuation of port 102, and thence through port 103, past ball check 104 and through passageways 107, 108 and 83. When the needle valve 101 is closed, the hole in orifice plug 113 controls the downward speed of the piston its entire length of travel. This speed is the minimum speed and may be varied by changing the size of the hole in the orifice plug 113. Greater downward speed may be obtained by opening needle valve 101 to different degrees.

When intermittent fluid pressure is applied through pipe 82 to valve casing 79, the fluid pressure is prevented from entering the cylinder through the exhaust ports by ball check valve 104, thus rendering effective the needle valve 88 or the orifice plug 96 to control the upward speed of piston 26. When the fluid pressure is permitted to exhaust from beneath the piston 26, the exhaust fluid is prevented from discharging through the intake passages by ball check 84, thus rendering effective the needle valve 101 or the orifice plug 113 to control the downward speed of the piston 26.

Fluid pressure which is constantly supplied to pipe 74 and, from the T 73, is carried to the three way cock 81 by pipe 82a, as shown in Figures 8 and 23. This three way cock 81 is normally open through its length as shown in Figure 22 so as to admit the intermittent pressure from pipe 80 to pipe 82, but by a quarter turn of the handle 81a, the intermittent pressure may be shut off and the constant pressure may be admitted to the greater area 69 of the piston 26 through pipes 82a and 82 to raise piston 26 to its uppermost position, in which position it will remain and be inoperative as long as the constant fluid pressure is so applied. The fluid pressure which operates piston 26 is held at a constantly uniform pressure and carries in suspension a lubricant for the lubrication of the parts with which the fluid pressure contacts.

Fluid pressure is employed for controlling the movement of the combustion cup, shearing mechanism, plunger and forming table. It is supplied from a suitable source of supply 258 through the pressure regulating valve 275 to the T connection 276 and thence to the regulated air reservoir 277. From the T connection 276, regulated fluid pressure is also supplied to the three way connection 259 at 260 via pipe 278, stop cock 279, strainer 280 and pipes 281, 282 and 283. From the three way connection 259, the fluid pressure flows into the header pipe 261 and thence to the fluid pressure operated parts of the above-mentioned units, via valve casing 202 and pipe 262 (intermittent fluid pressure to the cylinder 178 for actuating the combustion cup horizontally,) valve casing 203 and pipe 263 (intermittent fluid pressure to the cylinder 179 for actuating the combustion cup vertically), valve casing 223 and pipe 80 (intermittent fluid pressure to the plunger operating cylinder), valve casing 206 and pipe 264 (intermittent fluid pressure for initiating operation of the shears), pipe 265 (constant fluid pressure to the cylinders 178 and 179 for actuating the combustion cup horizontally and vertically and also to the cylinder of the injector 257), pipe 266 (constant fluid pressure to lubricate the shears and also to cool and lubricate the shear blades), and pipe 267 (intermittent fluid pressure for initiating movement of the forming machine).

Lubrication of the fluid pressure operated parts of the above-mentioned units is accomplished by suspending a lubricant in the pressure fluid employed for operating purposes. In effecting such suspension of a lubricant in the said fluid pressure, a sight feed type of lubricator 268 is employed. This sight feed lubricator embodies an oil reservoir from which a predetermined amount of oil is fed to the three way connection 259. With the lubricant being fed to the three way connection, as the pressure fluid, from its source 258, enters the three way connection 259 at 260, the lubricant in the three way connection 259 is carried with the pressure fluid into the pipe 261 and thence to the various operating parts of the units mentioned via pipes 262, 263, 80, 264, 265, 266, and 267.

Fluid under pressure which is ultimately burned in the combustion cup is supplied through pipes 272 to the injector 257. Gas which is properly regulated is also supplied to the injector through pipe 284. From the injector the combustible mixture is carried to the combustion cup through flexible connection 285 and pipe 286.

On and secured to member 57, Figures 4 and 20, there is a collar 114. This collar, which closely fits the external diameter of piston 26, serves to prevent the entrance of foreign matter that might adhere to the exposed surface of the piston, when in elevated position, into the working parts below the collar. It also prevents the lubricant below from creeping above the collar. This latter feature will be explained more fully later.

Piston 26 has an annular groove 115 (see Figure 4) around it just above the packing rings 116. From the groove 115 there are provided ports 117 which communicate with the interior of piston 26. Any fluid pressure escaping past rings 116 will follow the piston and cylinder walls to groove 115 and pass through ports 117 into the interior of piston 26. From this point, it may escape through keyway 24 in screw 21 to the atmosphere. The relief of pressure provided by groove 115 and port 117 will prevent an accumulation of pressure above the groove 115 which would interfere with the lubrication above this point, while the oil-laden fluid pressure will provide lubrication below groove 115. The groove 115 also forms an oil reservoir to supply lubrication to the piston. Should it be found desirable to apply additional lubrication, this may be done by removing plug 118 and drainage may be had by removing plug 119, see Figure 4.

The cylinder 56 has a recess 120 on its inner surface, see Figures 4 and 20, and a port 121 communicating therewith. Member 57 has a port 122 registering with port 121. Port 122 is threaded at its outer end to receive oil cup 123. Lubricant supplied to oil cup 123 passes through ports 122 and 121 to recess 120 which then becomes a reservoir to supply lubricant to piston and cylinder wall surfaces above and below recess 120 as piston 26 reciprocates.

The upward movement of piston 26 carries the lubricant upward. The major portion of the lubricant so carried is scraped off by tight-fitting collar 114. By the downward movement of the piston, the lubricant on its surface above the end of cylinder 56 is scraped off by the close-fitting edge of cylinder 56, as shown at 124, Figure 20. The scraping action of collar 114 and cylinder edge 124 upon piston 26 will flood with lubricant the space between collar 114 and the end of cylinder 56, the collar 114 preventing the escape of the lubricant. The end of cylinder 56 has a groove 125 cut in its end, (see Figures 20 and 21) and from this groove there are a plurality of ports 126 leading vertically to recess 120, as shown in Figures 16, 20 and 21. The lubricant accumulated on the top of the end of the cylinder is thus returned to recess 120 to be redistributed.

On the end of cylinder 56, at its outermost edge, there is another groove 127 in its upper surface, (see Figures 20 and 21). This groove is formed by reducing the external diameter of the cylinder so that the cylinder forms one side and the bottom of the groove, while the close fitting member 57 forms the other side. Lubricant in groove 127 has two outlets through ports 128 and 129, as shown in Figures 20 and 21, and ports 128 and 129 communicate with ports 130 and 131, respectively, see Figure 16. The ports 132 and 133 furnish lubricant to the walls of the bifurcated portion of member 57 and to the sides of slidingly guided member 49.

Port 130 registers with port 134 and port 131 registers with port 135. Ports 134 and 135 both pass through the wall of cylinder 56 and communicate with recess 120. Excess lubricant may thus drain back to recess 120 through ports 130 and 134 and through ports 131 and 135. When the head pressure of the lubricant in cup 123 is sufficient, member 49 may be lubricated through recess 120, ports 134 and 135, ports 130 and 131 and through ports 132 and 133.

Although we have obtained very satisfactory results throughout long periods of operation by the use of ball check valves 77, 84 and 104, (see Figure 8), we find that valves such as shown in Figures 23 and 24 give better results. There is no tendency of these valves to get in a balanced position and they are positive in operation. This is our preferred form of check valve for use in valve casings 71 and 79. The ports, passageways, orifice control plugs and needle valve controls are identical with those previously described.

These three check valves are identical in construction so but one will be described. The chamber 136 in which these check valves operate is enlarged to permit the use of this larger valve and give free passageway to the fluid pressure. The valve bonnet 137 has a depending projection 138 which serves as a guide for the check valve 139, see Figure 24. This check valve is of a sleeve type. Below the stem 138, valve 139 is ported as at 140 for the purpose of venting and oil drainage, thus permitting the valve to work up and down freely. These valves are shown in seated position and the lift is limited by the edge 141 of the valve striking the lower surface of valve bonnet 142.

The timing mechanism which we employ to intermittently supply fluid pressure to the combustion cup, knife and plunger operating cylinders is contained in the timing box 180. (See Figure 3). This timing box 180 is supported upon a suitable standard 188. The ends of the timing box are closed by circular plates 189 and 190. Each of these ends provides suitable bearings in which is journaled a shaft 191 carrying a plurality of cam plates. The shaft 191 is driven from a source of power by any suitable gearing and is shown as being driven from a variable speed motor 192, through a shaft 193, worm 193a and worm wheel 193b, the worm wheel being mounted upon the shaft 191. (See Figure 3.)

In order to permit of ready and easy access to the interior of the timing box 180, the doors 273 are provided as shown in Figure 1, (see Figure 3 wherein doors are removed).

Mounted upon the shaft 191 are cam plates 194 which are rigidly fastened to the shaft by any suitable means, (see Figure 3.) Also mounted upon the shaft 191 are a plurality of loosely mounted cam plates 195. The cam plates 194 and 195 are arranged in pairs, carrying gears 196 upon their opposing faces. These gears 196 are in mesh with pinions 197. Each of the pinions 197 is mounted upon a depending pin which is similar to the depending pin 212a of Figure 30 and which is carried by a block 199. Each of the blocks 199 is rotatably mounted upon the said shaft 191 and is similar to the block 214 of Figures 27 and 30. The ends of the depending pins are secured in a suitably provided yoke member 198 so that the said pinions 197 may be adjusted simultaneously and in perfect unison by a single adjusting movement of the hand wheel 200.

The cam plates 194 and 195 support cam rollers 201 which are adapted to contact with and unseat certain poppet valves contained in the valve casings 202 and 203, (see Figure 3.) This part of the timing mechanism provides the timing features for the operation of the hereinbefore mentioned combustion cup 177, that is, the cams and cam rollers control certain valve mechanisms, which, in turn, control the admission and exhaust of fluid pressure to and from the piston and cylinder constructions employed for moving the said combustion cup 177 both horizontally and vertically. The structure just described is substantially embodied in and substantially described in an application which we have filed jointly on the 30th day of June, 1920, Serial No. 392,916, on which Patent No. 1,760,999 was granted to us on June 3, 1930, as assignors to Hartford-Empire Co.

The shaft 191 also carries a single cam plate 204 rigidly secured thereto by any suitable means, (see Figure 3.) This cam plate 204 carries a cam roller 205 which operates at certain predetermined intervals to unseat a poppet valve contained in the valve casing 206, which, in turn, is adapted to control the admission of fluid pressure for initiating the operation of the knife structure (see Figure 2). The cam plate 204 also has a cam roller 205a which is adapted to unseat at predetermined intervals a poppet valve 207 contained in a valve casing, (not shown). This valve casing is concentrically adjustable with respect to the cam plate 204 by means of the hand wheel 208 and its cooperating mechanism. The action just referred to and the valve structure involved pertain to the means for intermittently initiating movement of the forming machine in a certain timed relation to the previously described operating units. This structure just described is also substantially embodied in and substantially described in said application which we have filed jointly on the 30th day of June, 1920, Serial No. 392,916, now Patent No. 1,760,999 as aforesaid.

The plunger timing mechanism (see Figures 25 to 30, inclusive) is also contained in the timing box 180 and may comprise a cam plate 209 rigidly attached to the shaft 191 and a cam plate 210 loosely mounted upon the said shaft, the said cam plates 209 and 210 being arranged in a pair. These cam plates 209 and 210 carry upon their adjoining faces gears 211. These gears 211 mesh with the pinion 212. This pinion is mounted upon a depending pin 212a which is carried by the block 214 which is, in turn, rotatably mounted upon the shaft 191. The block 214 (Figure 30) contains an oil reservoir 214a. Oil in this reservoir flows to the shaft bearing for lubricating purposes via oil ducts 214b. The lower end 213 of the depending pin 212a (see Figure 30) extends into a bifurcate member 215 which provides an adequate connection for means for concentrically adjusting the pinion 212 with respect to cam plates 209 and 210 as will be duly described.

The adjustment of this bifurcate member 215 to regulate the position of the pinion 212 and the consequent relation of the cam plates is rendered possible by the provision of the depending jaw portions 216 and 217 of the bifurcate member 215 which are drilled transversely for the reception of a swivel pin 218 (see Figure 27.)

The swivel pin 218 is likewise drilled transversely as at 219 and is internally threaded for the reception of a hand-operated screw such as 250 in Figure 30. The pin 218 is so fitted that it will turn freely in the jaw portions 216 and 217, and the threaded rod is shouldered as at 251. Beyond this shoulder, this screw rod is reduced as at 252 and passes through a transverse hole 253 in the swivel pin 254 (Figure 30). The handle for manipulating the screw rod for these particular pairs of cam plates desirably takes the form of a hand wheel 255 rigidly secured to the screw rod and separated from the flattened surface of the swivel pin 254 by means of a spring washer 256. This construction permits of a ready regulation of the position of the bifurcate member 215 so as to alter the position of the pinion and to consequently alter the relation of the rigid and loose cam plates with relation to each other. Thus, by turning the hand wheel 255, the bifurcate member 215 and consequently the pin 218, will be given a concentric motion around the shaft 191. Furthermore, the swiveled pin 218 permits free movement of the bifurcate member.

The cam plates are of circular form and are provided at determinate intervals around their edges with apertures for the reception of pins 220 threaded for the reception of nuts 221 and provided with shoulders so that the plates will be clamped between the nuts 221 and the shoulders. These pins rotatably support cam rollers 222. The number of apertures provided in these cam plates to permit of adjustment of the rollers as desired have not been shown because a different number of holes may be provided for different adjustments. However, a sufficient number of holes or apertures are provided to permit of any necessary adjustment and these holes are so located that the edges of the rollers will project beyond the periphery of the plate to cooperate with the stems of poppet valves which are thus actuated to control the main differential area valve which, in turn, controls the application of intermittent fluid pressure to the cylinder which governs the movement of the plunger 6.

The differential area valve, together with the poppet valves referred to above, are contained in the valve casing 223. An understanding of this structure will be facilitated by referring to Figures 28 and 29.

The casing 223 is constructed to contain a differential area piston 224 which is provided with two conical valves 225 and 226 and which carries a piston head construction 227 upon its base. The valve 225 is designed to cooperate with a valve seat 228 and the valve 226 is designed to cooperate with a valve seat 229. In between these valve seats 228 and 229 there is provided a passage 230 which is connected at its upper end to a pipe 80 that leads to the valve mechanism which controls the admission and exhaust of intermittent fluid pressure to the space in front of the larger area of the piston 26 contained in the plunger operating cylinder 56.

Below the valve seat 229 there is provided a recess 232 and a passageway 232a leading therefrom through the bottom of the casing 223 (see Figures 25, 26, 28 and 29) and communicating with exhaust ducts 233 in valve base 233a. These exhaust ducts 233 lead directly into the timer box and the exhaust air which they deliver into such timer box is sufficiently laden with oil to effectively lubricate the gears, rollers and pins of the timing mechanism.

Supplemental to this differential area valve piston we have provided poppet valves 234 and 235. These poppet valves are pressed downwardly against their seats by coil springs 236 and 237 bearing in sockets provided therefor. These poppet valves are also provided with depending stems 238 and 239 which extend downwardly through the top of the timer box and into juxtaposition to the cam plates 209 and 210 which are rotating in opposite directions. The lower ends of these stems 238 and 239 are so located that they will be elevated by the rollers 222 carried upon the cam plates 209 and 210, respectively.

Leading into the upper end of the casing 223 is a constant pressure air pipe 240 which delivers air under pressure to a chamber 241 above the valve seat 228 and the valve 225. This chamber 241 is provided with a bypass 242 leading downwardly to the poppet valve 234.

In operation of this structure, (see Figures 27, 28 and 29) the rotation of the cam plate 209 brings its roller into contact with the stem 238 of the poppet valve and this raises the poppet valve and permits a free passage of the air from pipe 240 and chamber 241 through bypass 242 past poppet valve 234 and through passageway 243 to the face of the piston head construction 227 of the differential area piston 224. Until the raising of this poppet valve, the differential area piston has been held down by the constant fluid pressure acting upon the upper end of the valve 225 in the chamber 241. However, the admission of air to the face of the piston head 227 serves to immediately overcome the pressure in the chamber 241 due to the fact that the area to which the air is applied upon the piston head 227 is greater than the area of the upper side of the valve 225. The result is that the piston 224 immediately moves upwardly and unseats the valve 225 at the same time seating the valve 226. Then, the air under pressure from chamber 241 passes by the valve 225, into the passage 230 and thence by way of the pipe 80 to the valve mechanism controlling the admission and exhaust of fluid pressure to and from large area of the piston 26 in the plunger operating cylinder 56. In the continued operation of the timer, the roller or cam plate 209 disengages the stem 238 of poppet valve 234 permitting the spring 236 to seat the poppet valve 234 and the roller 222 on cam plate 210 comes into contact with the stem 239 of poppet valve 235 and raises this poppet valve from its seat. Immediately, the air acting on the face of the piston head 227 is exhausted by way of passage 244, poppet valve 235 and passage 245 into the timer box. When this occurs, the differential area valve immediately drops due to the pressure in chamber 241, seating valve 225 and unseating valve 226. The result is that the pipe 80 and the passage 230 are connected to the chamber 232, and to the exhaust ports 233 via valve 226 and ports 232a so that the air in front of the larger area of the piston 26 in the plunger operating cylinder 56 may exhaust through pipe 80, passage 230 past valve 226 into chamber 232 and through exhaust ports 232a and 233 into the timer box 180 as the said piston 26 makes its downward stroke. In continued operation of the timer, the roller on cam plate 210 disengages the stem 239 of poppet valve 235 permitting the spring 237 to seat the poppet valve 235 whereupon the face of the piston head 227 is cut off from atmosphere. In further operation, the above-described cycle of operations again takes place.

An additional feature of this differential area valve consists in the provision of a means for maintaining the valve raised by what is termed an air lock (Figure 28). It takes the form of a port 246 and a passage 247 which leads from the passage 230 through the wall of the valve 226 to the face of the piston head 227. The result is that when the valve 225 is raised and air is permitted to pass from the chamber 241 into the passage 230 and thence to the pipe 80, a portion of this air also enters the port 246 and passes through the passage 247 to the face of the piston head 227. The air thus passing to the face of the piston head 227 is sufficient to compensate for all leakage and to maintain sufficient pressure beneath the differential area valve to lock it in raised position. However, the port 246 is of a lesser diameter than the passage 244 so that when the poppet valve 235 is raised, the air will exhaust from face of piston head 227 at a greater rate than it can be supplied through port 246 and passage 247 so that instantly the said pressure will be reduced to a point permitting the differential area valve to move to its normal lower position.

By the above construction of the cam plates 209 and 210, cam plate gears 211, and pinion 212, it is readily understood that as the shaft 191 rotates, the said cam plates rotate in opposite directions.

By adjusting the hand wheel 255 clockwise, the roller 222 on cam plate 210 raises the poppet valve stem 239 at a longer interval after the raising of the poppet valve stem 238 whereupon the piston 26 in cylinder 56 descends at a later time than before the adjustment took place. This causes the acceleration to occur at a later period. Conversely, by adjusting the hand-wheel anti-clockwise, the roller 222 on cam plate 210 raises the poppet valve stem 239 at a shorter interval after the raising of poppet valve stem 238 whereupon the piston 26 in the cylinder 56 descends at an earlier time than before the adjustment took place. This causes the acceleration to occur at an earlier period.

Since the intermittent pressure is admitted only to raise the plunger and is controlled by the cam roller 222 on the cam plate 209 and the said intermittent pressure is exhausted to permit lowering of the plunger by the cam roller on the cam plate 210, the period of rest of the plunger in upper position may be varied as may the period from start of upward movement to start of downward movement. However, in order to avoid adjustments that will prevent the formation of straight-sided charges, we preferably prevent alteration of the period of rest of the plunger in its lower position by providing the roller 222 on cam plate 209 which is only adjustable by stopping of the machine and which is therefore not subject to manipulation by operators of the apparatus during operation. With this construction, all adjustments necessary to the obtaining and the maintenance of the proper sizes, weights and shapes of charges are provided while undesirable adjustments are practically precluded.

The adjustment and regulation of the plunger timing mechanism is independent of all other adjustments of other operating parts made theretofore and thereafter and adjustment of same does not in any way affect the adjustment of any of the other parts.

The combustion cup, shearing mechanism, accelerating plunger and forming table, by means of their respective timing mechanism units, operate in a certain definite relation to each other.

In operation, the molten glass flows from the spout into the delivery aperture thereof. Due to the weight of the glass in the spout, a portion of this glass extrudes through the delivery aperture. At a predetermined interval after the beginning of the extrusion of the glass through the delivery aperture and, at a chosen instant, the accelerating plunger moves downwardly in the glass. The downward movement of the plunger is at such a rate of speed as to assist in the extrusion of the glass to such an extent that the extrusion of the glass from the aperture is at a rate substantially greater than the gravity rate of downfall of the already-extruded glass whereby substantially straight-sided charges are delivered.

The plunger continues its downward movement to a predetermined depth in the glass whereupon a predetermined period of rest of the plunger is effected. At a chosen instant, the shearing knives are brought together immediately beneath the delivery aperture so as to sever a portion of the extruded glass. Immediately after the severing of the extruded glass and the moving apart of the severing knives, the combustion cup starts to move whereupon, simultaneously therewith, the pressure of the combustible mixture therein is greatly increased, showing an increased flame. The combustion cup first moves horizontally in an arc until beneath the delivery aperture whereupon it moves vertically (upward) until it assumes a capping relation to the delivery aperture.

At a chosen instant, at or about the time that the combustion cup assumes the capping relation to the delivery aperture, the period of rest of the plunger in its downward position is terminated and the plunger moves upwardly. After a predetermined interval, the combustion cup is moved vertically (downward) and then swung horizontally in an arc out of position beneath the delivery aperture. The extrusion of the glass again takes place and the above-described cycle is again completed, this taking place as long as the apparatus is in operation.

It will be obvious that, in the operation of our invention, intermittent fluid pressure may be admitted beneath piston 26 by means of the timing mechanism at any chosen time during the cycle of operation to raise the piston and plunger 6. This fluid pressure may be exhausted at any chosen time during the cycle of operations to permit the constant fluid pressure to move the piston and plunger downwardly. The length of the stroke of the piston and plunger may be varied at will, while in operation, by knurled nut 51. The depth at which the plunger operates in the glass may be varied while in operation by handles 42 operating nut 36. Should the position of opening 4 vary longitudinally with the spout, the plunger may be adjusted to register with the opening 4 by loosening bolts 58 and turning member 57 until the desired position is reached, when the bolts 58 will then be tightened to maintain the plunger in position.

The upward speed of the plunger may be rapid or slow, as desired, by the degree the needle valve 88 is opened or closed, respectively. This regulation is independent of and does not alter the downward speed of the plunger. The downward speed of the plunger may be rapid or slow, as desired, by the degree needle valve 101 is opened or closed, respectively. This regulation is independent of and does not alter the upward speed of the plunger.

The plunger may be raised out of the glass and above the spout structure by means of nut 36 and handles 42. When in this position, by raising member 49 to horizontal position, the plunger may be swung 180° in an arc and held in this position by dropping member 49 between bifurcate extension 63 of member 57. This position is desirable for the removal and placing in position of hot plungers on arm 14.

The speed of the plunger may be varied by varying the air pressure. The plunger may be raised and held in inoperative position without stopping the timing mechanism by turning the handle of three way valve 81 to cut off the intermittent pressure and admit the constant pressure under piston 26.

Every adjustment of this apparatus may be made while the apparatus is in operation, each adjustment is independent of every other adjustment and no adjustment will interfere with or alter any adjustment already made.

We have found that the use of our enclosed combustion under pressure for stopping the extrusion of glass after each cutting operation is particularly effective in cooperation with the accelerator plunger. By various manipulations of the cup and the plunger or the cup alone both the weight and shape of the charges may be varied or controlled or both. The use of the enclosed combustion is further advantageous in that it makes possible the regulation or control of the shape of the lower end of the gather. In other words, this enclosed combustion may be so manipulated as to ensure the shaping of the charges to conform to the shape of the blank mold into which these charges are to be put. Furthermore, it will be obvious that our enclosed combustion makes possible the regulation of the weights and shapes of the charges without the necessity for reliance upon the plunger adjustments. Likewise, the use of our enclosed combustion makes possible the regulation and the broadening of the range of the speeds of charge-making that is not attainable with the plunger alone.

We have found that the use of our enclosed combustion under pressure, or the equivalent thereof, in cooperation with an accelerating plunger results in certain advantages not attainable by the plunger alone. Some of these advantages may be enumerated as follows:

With our method and apparatus, the plunger may, if desired, be devoted practically exclusively to the extrusive action and need not be utilized for the positioning of the stub of glass. Likewise, the path of travel of the plunger may be that path of travel which is best suited for effecting the extrusive action required without the necessity of considering whether or not the path of travel of this plunger is the most desirable path for positioning the stub after each cutting action.

Still further, the use of our fluid pressure cup relieves the plunger of the burden of determining the instant of starting of the extrusive action. It is equally obvious that our pressure cup may support the glass and stop extrusion for a longer period of time than is possible with the plunger. As a matter of fact, with our method, it is possible to move the plunger back entirely to its initial position, while the glass stub is being supported. This makes possible a longer period of stoppage of the glass and, consequently, a greater range of adjustment of the length of the feed period.

Another advantage of our method and apparatus results in the fact that columns of glass of substantially great cross-section may be severed for the production of blunt-nosed charges with impugnity while, at the same time, a flaming cup may well eliminate the shear marks thus produced. Likewise, this flaming cup may regulably position the stub of glass to change from the blunt-nosed charges to pointed charges, or vice versa. With our method, the bushing is intermittently subjected to a flame at regular intervals, thereby compensating for the loss of heat which might otherwise occur. In effect, the heat from this flaming cup further heats the bushing and has the same action as a lubricant, since the viscous glass will slip downwardly over the clay walls of the bushing aperture more readily when these walls are maintained at a comparatively high temperature.

Another advantage of our invention arises from the fact that the plunger in cooperation with the aperture shapes the major portion of the charge, while the flaming cup shapes the nose of the charge. In other words, these two elements together with the head pressure make possible an improved shaping of the charge to conform to the shape of the blank mold in which these charges are to be put. As already indicated, our method enables complete and effective control of the weight, shape and dimensions of the charges, with or without varying the rate of production.

Many of the above described features relating to the action of the accelerating plunger and the underneath glass-positioning support are disclosed in our copending application Serial No. 249,422, filed August 12, 1918, of which the present application is a continuation in part for all features common to these two applications.

Having thus described our invention, what we claim is

1. In combination with a glass container having a delivery aperture in its base, an accelerator plunger operating in said container and in alignment with its delivery aperture, and means for moving and locking said plunger out of alignment with said delivery aperture.

2. The method of producing charges of glass which comprises the delivery of successive charges of glass through an opening in the bottom of a glass containing receptacle, and controlling the weights and shapes of the charges by an accelerator plunger in conjunction with a means for stopping the extrusion from below by an enclosed combustion under pressure.

3. The method of getting charges of glass from viscous mass which comprises superimposing a mass of glass upon a delivery aperture in the base of a receptacle, extruding successive portions of glass through such aperture, using an accelerator to assist extrusion to an extent necessary to produce substantially straight sided charges, severing with metal shears and stopping extrusion with an enclosed combustion under pressure.

4. The method of getting charges of glass from viscous mass which comprises superimposing a mass of glass upon a delivery aperture in the base of a receptacle, extruding successive portions of glass through such aperture, using an accelerator to assist extrusion to an extent necessary to produce substantially straight sided charges, severing with metal shears, and capping the delivery aperture with a container having a combustible mixture burning therein under pressure after each severing operation.

5. A glass furnace including a flow spout, a plunger adapted to reciprocate in said flow spout, means for reciprocating the plunger, means for lifting the plunger clear of the flow spout, and means whereby the plunger may be swung laterally after clearing the flow spout.

6. A glass furnace including a flow spout, a plunger adapted to reciprocate in said flow spout, fluid pressure operated means for reciprocating the plunger, means for lifting the plunger entirely clear of the flow spout, and means whereby the plunger may be swung laterally after clearing the flow spout.

7. A glass furnace including a flow spout, a plunger adapted to reciprocate in said flow spout, fluid pressure operated means for reciprocating the plunger, means for adjusting the length of the plunger stroke, means for lifting the plunger entirely clear of the flow spout, and means for swinging the plunger laterally after it is clear of the flow spout.

8. A glass furnace including a flow spout, a plunger adapted to reciprocate in said flow spout, fluid pressure operated means for reciprocating the plunger, means for adjusting a limit of the plunger stroke, means for lifting the plunger entirely clear of the flow spout, and means for swinging the plunger laterally after it is clear of the flow spout.

9. A glass furnace including a flow spout, a plunger adapted to reciprocate in said flow spout, fluid pressure operated means for reciprocating the plunger, means for lifting the plunger entirely clear of the flow spout, means whereby the plunger may be swung laterally after clearing the flow spout, and means for locking the plunger in the position to which it is laterally swung.

10. In a glass feeder provided with a reciprocating plunger, pneumatic means for reciprocating said plunger, comprising a piston and cylinder, means for admitting pressure above the piston, means for intermittently exhausting pressure below said piston, and a plurality of vents successively controlling the rate of exhaust of pressure below said piston.

11. In a glass feeder, a container for the glass having an outlet, a reciprocating plunger moving toward and from the outlet to assist in the control of issuance of glass therefrom, pneumatic means for reciprocating the plunger, comprising a piston and cylinder and means for intermittently admitting an exhausting fluid pressure beneath the piston, a plurality of vents successively controlling the exhaust of air beneath the piston, and means controlled by the movement of the piston for progressively closing one of said vents.

12. A glass furnace including a flow spout, a plunger adapted to reciprocate in said flow spout, fluid pressure operated means for reciprocating the plunger, means for adjusting the limits of the plunger stroke, means for lifting the plunger entirely clear of the flow spout, and means for swinging the plunger laterally after it is clear of the flow spout.

13. A method of getting preformed charges of viscous glass which comprises superimposing a mass of viscous glass upon a delivery aperture of chosen dimensions, extruding portions of said mass through said aperture, applying pressure during the extrusion to control the shape of the glass, severing the charge when formed as desired, and stopping further extrusion temporarily with an enclosed combustion of gas and air under pressure.

14. Apparatus for delivering preformed charges of viscous glass from mass comprising a receptacle with a delivery aperture of chosen dimensions in its base, means for applying an extrusive pressure to the glass above the aperture, severing means, and means for applying an enclosed combustion of gas and air under pressure to the aperture immediately after severing.

15. Apparatus for getting preformed charges of viscous glass from mass comprising a receptacle with a delivery aperture of chosen dimensions in its base, a plunger operating in said glass above said aperture to assist in extruding the glass through said aperture, severing means, and a cup movable into and out of capping relation to the aperture to temporarily stop extrusion after each cutting action, said cup being fed with air and gas burning under pressure therein when the cup is in capping relation to the aperture.

16. The method of forming a succession of mold charges of definite shape, dimensions and weight suitable for the molds to be fed which comprises superimposing a mass of viscous glass upon an aperture of chosen dimensions, operating shears at regular intervals below the aperture in position to sever charges of glass from extrusions through said aperture, extruding successive columns of glass past the severing plane, using an accelerating plunger in the glass above the aperture to assist head pressure to force each extrusion of glass through such aperture at a rate of speed sufficient to ensure that the major portion of each charge will be formed by the act of extrusion rather than by sagging action after it passes through the aperture, and checking each stub after severing by a fluid pressure regulated to position the lower end of each embryonic charge at the plane necessary for the shape to be produced, and severing each charge while it re- 17. The method of forming a succession of mold charges of definite shape, dimensions and weight suitable for molds to be fed which comprises superimposing a mass of viscous glass upon an aperture of chosen dimensions, operating shears at regular intervals below the aperture in position to sever charges of glass from successive columns of glass extruded through said aperture, extruding successive columns of glass through said aperture and past the severing plane, using an accelerating plunger in the glass above the aperture to assist head pressure in forcing each extrusion of glass through such aperture at a rate of speed sufficient to ensure that the major portion of each charge will be formed by the act of extrusion, checking each stub of glass by an underneath supporting element after a charge has been severed therefrom for a preselected portion of the interval between successive severing operations to regulate the period of flow and by such element regulably positioning the stub for the starting of the glass feeding period, whereby the lengths of the charges are determined by the starting position of the stub and the period of feed, and severing each charge while it retains the shape imposed upon it by the extrusive action and the checking and positioning action.

18. The methods of forming a succession of mold charges of definite preformed shape, dimensions and weight suitable for the molds to be fed which comprises superimposing a mass of viscous glass upon an aperture of chosen dimensions, operating shears at regular intervals below the aperture in position to sever charges of glass from successive columns of glass extruded through said aperture, extruding successive columns of glass through said aperture and past the severing plane, using an accelerating plunger in the glass above the aperture to assist head pressure in forcing each extrusion of glass through such aperture at a rate of speed sufficient to ensure that the major portion of each charge will be formed by the act of extrusion, checking each stub of glass by an underneath supporting fluid pressure after a charge has been severed therefrom for a preselected portion of the interval between successive severing operations to regulate the period of flow and positioning the said stub at a selected position by the pressure of the fluid in said underneath supporting element and the period of application thereof, and severing each charge while it retains the shape imposed upon it by the extruding action and the positioning action.

19. The method of forming a succession of mold charges of definite preformed shape, dimensions and weight suitable for the molds to be fed which comprises superimposing a mass of viscous glass upon an aperture of chosen dimensions, operating shears at regular intervals below the aperture in position to sever charges of glass from successive columns of glass extruded through said aperture, extruding successive columns of glass through said aperture and past the severing plane, using an accelerating plunger in the glass above the aperture to assist head pressure in forcing each extrusion of glass through said aperture to control the shape of the major portion of each charge by the act of extrusion, checking each stub of glass by an underneath supporting element and shaping and positioning each stub by said underneath supporting element, removing such underneath supporting element at a preselected instant before each severing operation to regulate the period of flow, whereby the weight, shape, and dimensions of the portion of the successive columns below the severing plane at the instant of severing are controlled, and severing each charge while it retains the shape imposed upon it by the extruding action and by the shaping and positioning action of the underneath supporting element.

20. The method of forming a succession of mold charges of definite preformed shape, dimensions and weight suitable for the molds to be fed which comprises superimposing a mass of viscous glass upon an aperture of chosen dimensions, operating shears at regular intervals below the aperture in position to sever charges of glass from successive columns of glass extruded through said aperture, extruding successive columns of glass through said aperture and past the severing plane, using an accelerating plunger in the glass above the aperture to assist head pressure in forcing each extrusion of glass through said aperture to control the shape of the major portion of each charge by the act of extrusion, checking each stub of glass by an underneath supporting element in the form of an enclosed fluid under pressure and shaping and positioning such stub by said underneath supporting element, removing such underneath supporting element at a preselected instant before each severing operation to regulate the period of flow, whereby the weight, shape and dimensions of the portion of the successive columns below the severing plane at the instant of severing are controlled, and severing each charge while it retains the shape imposed upon it by the extruding action and by the shaping and positioning action of the underneath supporting element.

21. The method of forming a succession of mold charges preformed as to shape, dimensions and weight suitable for the molds to be fed which comprises superimposing a mass of viscous glass upon an aperture of chosen dimensions, operating shears at reguplunger, and resilient means associated with the adjusting means for arresting the movement of the plunger at the high position.

32. A glass feeding apparatus comprising a receptacle for glass having a submerged discharge outlet in the bottom thereof, a plunger, a cylinder and piston for supporting and reciprocating the plunger, means mounted on the piston and cooperating with the cylinder for adjusting the length of stroke of said plunger from the low operating position of the plunger relative to the outlet while the apparatus is in operation, and means for resiliently holding the adjusting means in normal position.

33. A glass feeding apparatus comprising a receptacle for glass having a discharge outlet, a plunger, a cylinder having a piston of differential area construction, said piston having an adjustable piston rod arranged to rigidly connect to said plunger for supporting and reciprocating the plunger, means carried by the piston and associated with said cylinder for regulating the length of stroke of said plunger from a fixed low position, and means for adjusting the piston rod relative to the piston to vary the operating position of the plunger relative to the outlet.

34. A glass feeding apparatus comprising a receptacle for glass having a discharge outlet, a plunger, a cylinder and piston of differential area construction arranged to support the plunger and reciprocate it toward and from the outlet, said plunger being rigidly supported by the piston, means mounted on the piston and movable relative to said cylinder for regulating the length of stroke of said plunger, and means associated with the piston and cylinder for maintaining the angular relation of said cylinder and piston to maintain the plunger in alignment with the outlet.

35. A glass feeding apparatus comprising a receptacle for glass having a discharge outlet, a plunger, a cylinder and piston of differential area construction for supporting and reciprocating the plunger, said piston being rigidly connected to said plunger, guide means associated with the piston and cylinder for maintaining the angular relation of the cylinder and piston during the reciprocation of the piston, and adjustable means connecting the plunger to the plunger support for aligning said plunger with the outlet.

36. A glass feeding apparatus comprising a receptacle for glass having a discharge outlet, a plunger, a cylinder and piston of differential area construction for supporting and reciprocating the plunger, said piston being rigidly connected to said plunger, guide means associated with the piston and cylinder for maintaining the angular relation of the cylinder and piston during the reciprocation of the piston, means for adjusting the angular position of the piston relative to the cylinder, and adjusting means connecting the plunger to the plunger support for aligning the plunger with the outlet.

37. A glass feeding apparatus comprising a receptacle for glass having a discharge outlet, a plunger, a cylinder and piston of differential area construction for supporting and reciprocating the plunger, comprising a hollow cylindrical piston extending from within the cylinder, a piston rod rigidly connecting the piston and extending within the piston, and means carried by the piston for adjusting and guiding the piston rod longitudinally of the cylinder for preventing the lateral displacement of the plunger relative to the outlet.

38. A glass feeding apparatus comprising a receptacle for glass having a discharge outlet, a plunger, a plunger operating unit including a cylinder, a hollow cylindrical piston extending from within the cylinder, a piston rod rigidly connecting the piston and extending within said piston, and means on the piston for adjusting and guiding the piston rod longitudinally of the cylinder for changing the vertical operating position of the plunger.

39. A glass feeding apparatus comprising a receptacle for glass having a discharge outlet, a plunger, a cylinder and piston arranged to support and reciprocate it toward the outlet, an adjustable guide located on the cylinder for guiding the piston support during reciprocation, and means for adjusting the angular position of the guide relative to the cylinder to vary the horizontal position of the plunger relative to the outlet.

40. A glass feeding apparatus comprising a receptacle for glass having a discharge outlet, a plunger, a cylinder and piston operating unit for supporting and reciprocating the plunger, an adjustable guide located on the cylinder for guiding the piston support during reciprocation, a guide rod carried by the piston and adapted to engage the guide on the cylinder, and means on the guide rod for controlling the stroke of the piston and thereby to regulate the stroke of the plunger.

41. In apparatus for feeding mold charges of molten glass from a receptacle having a submerged outlet, a reciprocable plunger, a fluid-pressure cylinder and piston arranged to form a self-contained support for the plunger, means carried by the piston for vertically adjusting the plunger connection relative to the piston, means for maintaining the angular relation of the parts during the adjustment, means associated with the cylinder and piston for regulating the length of stroke of the plunger, said adjusting means being adapted to maintain the angular relation of said cylinder and piston, lar intervals below the aperture in position to sever charges of glass from successive columns of glass extruded through said aperture, extruding successive columns of glass through said aperture and past the severing plane, applying a positive pressure to the glass above said aperture to assist head pressure in forcing each extrusion of glass through said aperture to control the shape of the major portion of each charge by the act of extrusion, checking each stub of glass by an underneath supporting element and positioning each stub with its lower end in a definite starting plane by said underneath supporting element with such plane determined by the shape of charges to be produced, removing such underneath supporting element at a preselected instant before each severing operation to regulate the period of flow, and severing each charge while it retains the shape imposed upon it by the extruding action and by the shaping and positioning action of the underneath supporting element.

22. In apparatus for feeding molten glass, a receptacle for the glass having a discharge outlet, a plunger, a fluid pressure piston arranged to support the plunger and reciprocate it toward and from the outlet, and means carried by the piston for independently adjusting the horizontal and vertical positions of the plunger during reciprocation of the plunger.

23. In apparatus for feeding molten glass, a receptacle for the glass having a discharge outlet, a plunger, a plunger supporting means comprising a fluid actuated piston and cylinder, a piston rod adjustably mounted on the piston and rigidly connected to the plunger, and means associated with the piston rod for regulating the vertical position of the plunger relative to the outlet.

24. In apparatus for feeding molten glass, a receptacle for the glass having a discharge outlet, a plunger, plunger supporting means comprising a fluid actuated piston and cylinder, a piston rod adjustably mounted on the piston and rigidly connected to the plunger, means associated with the piston rod for regulating the vertical position of the plunger relative to the outlet, and means carried by the piston and cylinder for regulating the horizontal position of said plunger relative to the outlet.

25. In apparatus for feeding molten glass, a receptacle for the glass having a discharge outlet, a plunger, plunger supporting means comprising a fluid-pressure cylinder and piston, a piston rod adjustable longitudinally of the piston and arranged to rigidly support the plunger, and means carried by the plunger support for aligning the plunger with the outlet.

26. In apparatus for feeding molten glass, a receptacle for the glass having a discharge outlet, a plunger, plunger supporting means comprising a fluid-pressure cylinder, a reciprocable piston therein having a piston rod arranged to rigidly support the plunger, means to adjust the piston rod relative to the piston to change the vertical position of the plunger relative to the outlet, and means carried by the piston and cylinder for maintaining the alignment of the plunger with the outlet.

27. In apparatus for feeding molten glass, a receptacle for the glass having a discharge outlet, a plunger, a fluid-pressure cylinder, a reciprocable piston therein having an adjustable piston rod arranged to rigidly support the plunger, and means to adjust the piston rod relative to the piston to change the vertical stroke position of the plunger relative to the outlet.

28. In apparatus for feeding molten glass, a receptacle for the glass having a discharge outlet, a plunger, plunger-supporting means comprising a fluid-pressure cylinder, a reciprocable piston therein, a piston rod arranged to rigidly support the plunger, means to adjust the piston rod relative to the piston to change the vertical position of the plunger relative to the outlet, and means associated with the piston and cylinder for maintaining the alignment of the plunger with the outlet, said means for vertically adjusting the piston rod and for maintaining the alignment of the plunger being independently operable to effect said adjustments during operation.

29. A glass feeding apparatus comprising a receptacle for glass having a submerged discharge outlet in the bottom thereof, a plunger, a cylinder and piston for supporting the plunger and reciprocating it toward and from the outlet, means mounted on the piston for adjusting the vertical operating position of the plunger, means mounted on the piston and cooperating with the cylinder for adjusting the high position of said plunger relative to the outlet, and means for holding the adjusting means in adjusted position.

30. A glass feeding apparatus comprising a receptacle for glass having a submerged discharge outlet in the bottom thereof, a plunger, a cylinder and piston for supporting and reciprocating the plunger, means mounted on the piston for adjusting the vertical operating position of the plunger, means mounted on the piston and cooperating with the cylinder for adjusting the high position of said plunger, said two adjusting means being independently operable during the operation of the apparatus.

31. A glass feeding apparatus comprising a receptacle for glass having a submerged discharge outlet in the bottom thereof, a plunger, a cylinder and piston for supporting and reciprocating the plunger, means mounted on the piston and cooperating with the cylinder for adjusting the high position of said whereby the plunger may be reciprocated in vertical alignment with the outlet.

42. In apparatus for feeding mold charges of molten glass from a receptacle having a submerged outlet, a reciprocable plunger, a fluid-pressure cylinder and piston arranged to form a self-contained support for the plunger, the piston being connected to and arranged to form a rigid support for said plunger, means carried by the piston for vertically adjusting the plunger connection relative to the piston, means for maintaining the angular relation of the parts during the adjustment, means associated with the cylinder and piston for regulating the length of stroke of the plunger, said adjusting means being adapted to maintain the angular relation of said cylinder and piston, whereby the plunger may be reciprocated in vertical alignment with the outlet.

43. In apparatus for feeding mold charges of molten glass from a receptacle having a submerged outlet, a reciprocable plunger, a fluid-pressure cylinder and piston arranged to form a self-contained support for the plunger, a threaded piston rod guided for sliding movement in the piston and arranged to connect with and support the plunger, a threaded handle loosely mounted on the piston and arranged to engage the threaded rod to adjust said rod longitudinally of the piston, and means associated with the threaded handle for clamping the threaded rod to the piston whereby a rigid connection is maintained between the plunger and the supporting piston.

In testimony whereof we hereby affix our signatures.

OLIVER M. TUCKER.
WILLIAM A. REEVES.